(12) United States Patent
Woo et al.

(10) Patent No.: US 11,932,301 B1
(45) Date of Patent: Mar. 19, 2024

(54) HYGIENIC COVER FOR AUTOMOBILE

(71) Applicants: Young Suk Woo, Los Angeles, CA (US); Chang Deuk Woo, Los Angeles, CA (US)

(72) Inventors: Young Suk Woo, Los Angeles, CA (US); Chang Deuk Woo, Los Angeles, CA (US)

(*) Notice: Subject to any disclaimer, the term of this patent is extended or adjusted under 35 U.S.C. 154(b) by 0 days.

(21) Appl. No.: 18/218,258

(22) Filed: Jul. 5, 2023

(51) Int. Cl.
*B62D 1/06* (2006.01)

(52) U.S. Cl.
CPC .................. *B62D 1/06* (2013.01)

(58) Field of Classification Search
CPC ........... B62D 1/06; B60R 15/00; A47C 31/11; A47D 1/00
See application file for complete search history.

(56) References Cited

U.S. PATENT DOCUMENTS

2018/0064306 A1* 3/2018 Noble ..................... A47L 13/20

FOREIGN PATENT DOCUMENTS

EP 2862698 A1 * 4/2015 ............... B62D 1/06

* cited by examiner

*Primary Examiner* — Vinh Luong

(57) ABSTRACT

A hygienic cover that covers a contact part with which a human body is in contact, the hygienic cover includes a base cover directly in contact with the contact part; and a plurality of cover sheets stacked on top of one another, wherein the bottom one of the stacked cover sheets is attached onto the base cover, each of the cover sheets including: a hygienic layer, and an adhesive layer fixed to the bottom the hygienic layer, wherein the adhesive layer is detachable from the top of the hygienic layer of another cover sheet, wherein each of the cover sheets includes a non-adhesive portion formed on an edge thereof, wherein each of the cover sheets placed on top is removed from the remaining of the cover sheets by pulling the non-adhesive portion off when the cover sheet become contaminated.

17 Claims, 30 Drawing Sheets

HYGIENIC COVER FOR AUTOMOBILE

FIELD OF THE INVENTION

The present invention relates to a hygienic cover, and more particularly to a hygienic cover for an automobile.

BACKGROUND OF THE INVENTION

Recently, due to COVID-19, there has been an increased need for hygiene management to prevent infection from various viruses or pathogens.

An automobile, which is closely intertwined with daily life, is one of the places where hands and feet frequently come into contact, posing a high risk of viral or bacterial infection for both drivers and passengers.

Specifically, it is known that the level of bacteria inside an automobile is highest on the floor mat, followed by the steering wheel, gear shift knob, and seat. Notably, the number of bacteria inhabiting a steering wheel is approximately 26 times higher than that found on a toilet seat at home.

Accordingly, the hygienic cover of the present invention is devised to prevent and minimize hand or airborne infection of various viruses or pathogens inhabiting the interior of a vehicle by sterilizing and maintaining the interior of the automobile to be a hygienic environment.

SUMMARY OF THE INVENTION

According to a hygienic cover of the present invention, each of a plurality of the cover sheets placed on top can be removed from the remaining of the cover sheets by pulling the non-adhesive portion off when the cover sheet becomes contaminated. Accordingly, by pulling the single cover sheet off after use and using another new cover sheet every time, the automobile can be maintained clean and hygienic with convenience, and the risk of transferring germs or pathogens through contact can be minimized. Furthermore, the hygienic cover of the present invention facilitates effortless cleaning of the interior of the automobile, even after riding with pets such as dogs or cats. Additionally, the multiple cover sheets of the hygienic cover allows for prolonged and enduring utilization.

Specifically, according to one embodiment of the present invention, a hygienic cover that covers a contact part of an automobile with which a human body is in contact, comprises: a base cover the bottom surface of which is directly in contact with an exterior surface of the contact part of the automobile; and a plurality of cover sheets stacked on top of one another, wherein the bottom one of the stacked cover sheets is attached onto the top surface of the base cover, each of the cover sheets including: a hygienic layer, and an adhesive layer the top surface of which is fixed to the bottom surface of the hygienic layer, wherein the bottom surface of the adhesive layer is detachable from the top surface of the hygienic layer of another cover sheet of the plurality of cover sheets, wherein each of the cover sheets includes a non-adhesive portion, and the non-adhesive portion is formed on an edge of each of the cover sheet and includes only the hygienic layer and does not include the adhesive layer, wherein each of the cover sheets placed on top is removed from the remaining of the cover sheets by pulling the non-adhesive portion off when the cover sheet become contaminated.

In some embodiments, the base cover may be made of anti-bacterial nano silicone, wherein the hygienic layer of the cover sheet may be made of at least one of fabric or paper and contains at least one of a sterilizing agent, an antimicrobial agent, and an air freshener.

In some embodiments, the top surface of the hygienic cover may be more smooth than the bottom surface of the hygienic cover.

In some embodiments, the cover sheet may have at least one cut-out portion along an edge of the cover sheet so that the cover sheet wraps a three dimensional structure of the base cover.

In some embodiments, the contact part may be a steering wheel of the automobile, and the base cover may have a circular channel shape fitting over the steering wheel and having an opening along an inner circumference of the circular channel shape to receive the steering wheel, wherein each of the cover sheets may have a rectangular shape with a plurality of triangular cut-out portions formed along the edge of the cover sheet when it is spread out in a flat plane and is placed on the base cover in a way that two edges of the triangular cut-out portion meets each other so that the rectangular shape wraps the exterior surface of the base cover.

In some embodiments, each cover sheet which is in a same level of the stacked cover sheets may include two pieces, and the two pieces are placed on different portions of the base cover corresponding to the left and right sides of the steering wheel, respectively, wherein each of the pieces may have the non-adhesive portion, respectively.

In some embodiments, the contact part may be a gear shift knob of the automobile, and the base cover may have a pocket shape fitting over the gear shift knob and having an opening in the bottom thereof to receive a gear shift stick to which the gear shift knob is connected.

In some embodiments, each cover sheet which is in a same level of the stacked cover sheets may include multiple pieces, and each piece of the cover sheet may be placed on different portions of the base cover and has the non-adhesive portion, respectively.

In some embodiments, the contact part may be a parking brake handle of the automobile, and the base cover may have a cylinder shape fitting over the parking brake handle and having openings in the top and bottom thereof to receive the parking brake handle and expose the top of the parking brake handle.

In some embodiments, each cover sheet which is in a same level of the stacked cover sheets may include multiple pieces, and each piece of the cover sheets may be placed on different portions of the base cover and have the non-adhesive portion, respectively.

In some embodiments, the contact part may be at least one seat of the automobile, and the base cover may have a first rectangular shape resting on a backrest of the seat, and a second rectangular shape connected from the bottom of the first rectangular shape and resting on a seating area of the seat, wherein each cover sheets which is in a same level of the stacked cover sheets may cover the first and the second rectangular shape of the base cover.

In some embodiments, the at least one seat corresponding to the contact part may be a plurality of seats connected to each other, wherein the first rectangular shape of the base cover may cover the plurality of backrests of the plurality of seats, and the second rectangular shape of the base cover may cover the plurality of seating areas of the plurality of seats, wherein each cover sheet which is in a same level of the stacked cover sheets may cover both the first rectangular shape and the second rectangular shape.

In some embodiments, each cover sheet which is in a same level of the stacked cover sheets may include a first part covering the first rectangular part and a second part covering the second rectangular part, wherein the first and the second part of the each cover sheet may be separated from each other, wherein each of the first and the second part has the non-adhesive portion, respectively.

In some embodiments, base cover may include a hood shape on the top thereof to receive a headrest of the seat, the first rectangular shape connected from the bottom of the hood shape, and the second rectangular shape, wherein each cover sheet which is in a same level of the stacked cover sheets may include a first part covering the hood shape, a second part covering the first rectangular part, and a third part covering the second rectangular part.

In some embodiments, the first part of the cover sheet may not cover the back of the hood shape of the base cover with which the human body is not contact.

In some embodiments, either the first part and the second part may be separated from each other, the second part and the third part may be separated from each other, or both may be separated from each other, wherein each piece of separated parts of the cover sheet may have the non-adhesive portion, respectively.

In some embodiments, the contact part may be a floor mat of the automobile, and the base cover may have a flat rectangular shape covering a floor area of an interior space of the automobile.

In some embodiments, the contact part may be an armrest mat of the automobile, and the base cover may have a flat rectangular shape covering the armrest mat.

According to another embodiment of the present invention, a hygienic cover that covers a contact part of an automobile with which a human body is in contact, comprises: a silicone base cover the bottom surface of which is directly in contact with an exterior surface of the contact part of the automobile; and a plurality of cover sheets placed on the silicone base cover and each cover sheet stacked on top of one another, each of the cover sheet including: a hygienic layer made of at least one of fabric or paper and containing at least one of a sterilizing agent, an antimicrobial agent, and an air freshener; and an adhesive layer attached to the bottom surface of the hygienic layer, wherein the top surface of the hygienic layer is more smooth than the bottom surface of the hygienic cover, wherein the adhesive layer is fixed to the bottom surface of the hygienic layer and is detachable from the top surface of the hygienic layer of another of the cover sheets, wherein each of the cover sheet has at least one cut-out portion along an edge of the cover sheet so that the cover sheet wraps a three dimensional structure of the base cover, wherein each of the cover sheet includes a non-adhesive portion, and the non-adhesive portion is formed on an edge of each of the cover sheet and does not include the adhesive layer, wherein each of the cover sheets placed on top is removed from the remaining of the cover sheets by pulling the non-adhesive portion off when the cover sheet becomes contaminated.

In some embodiments, each cover sheet which is in a same level of the stacked cover sheets may include multiple pieces, and each piece of the cover sheet may be placed on different portions of the silicone base cover and have the non-adhesive portion, respectively.

DETAILED DESCRIPTION EMBODIMENTS OF THE INVENTIONS

Figure 1A:
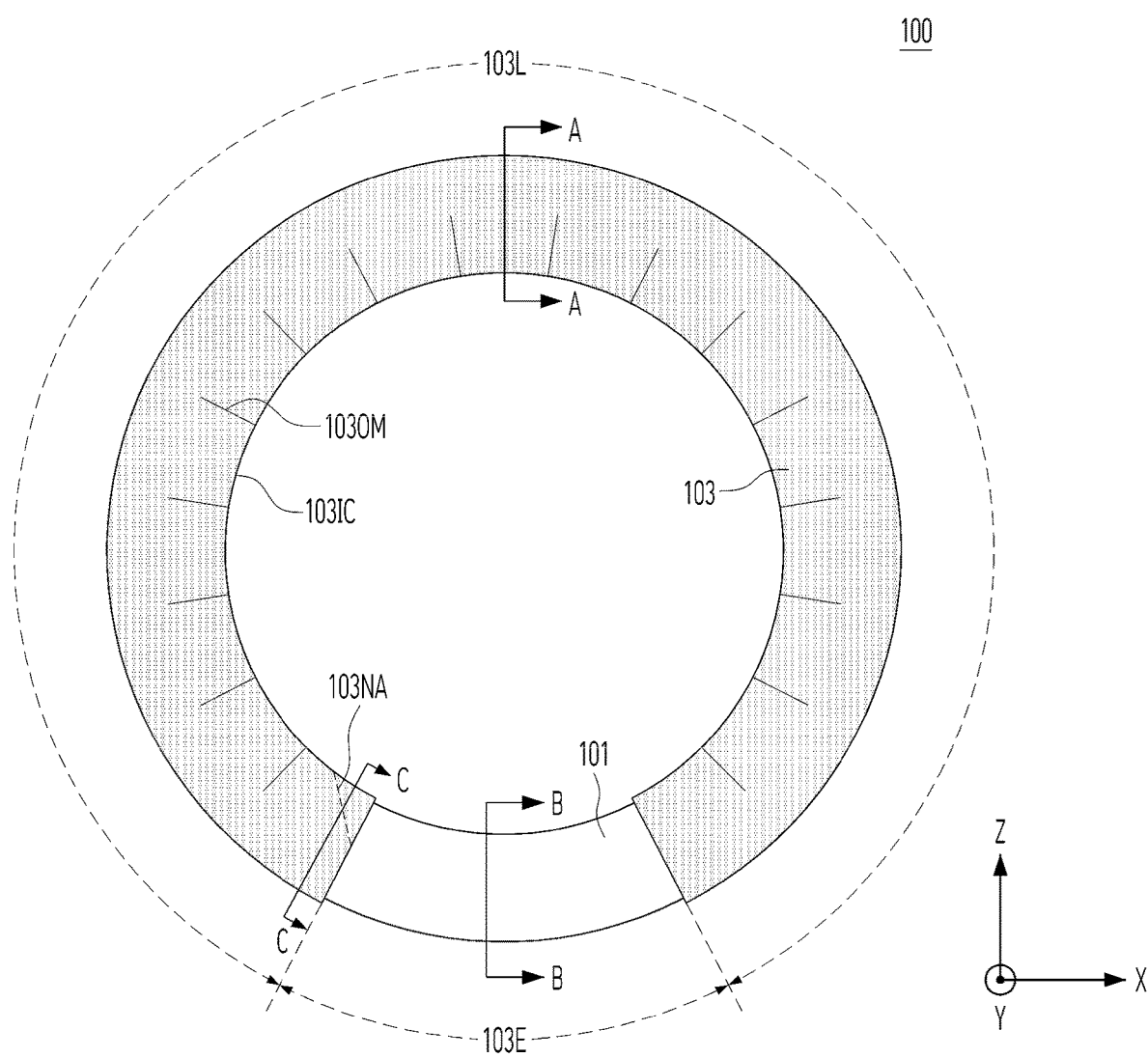
FIG. 1A is a front view illustrating a hygienic cover 100 that covers a steering wheel SW of an automobile according to one embodiment of the present invention.

Hereinafter, preferred embodiments according to the present invention will be described in detail in conjunction with the accompanying drawings.

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

In addition, as used in the specification including the appended claims, the singular forms "a", "an", and "the" include the plural, and reference to a particular numerical value includes at least that particular value, unless the context clearly dictates otherwise. Ranges may be expressed herein as form "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

The present invention provides a hygienic cover that covers a contact part of an automobile with which a human body is in contact. The hygienic cover of the present invention comprises: a base cover the bottom surface of which is directly in contact with an exterior surface of the contact part of the automobile and a plurality of cover sheets stacked on top of one another, wherein the bottom one of the stacked cover sheets is attached onto the top surface of the base cover. Each of the cover sheets of the present invention includes a hygienic layer and an adhesive layer the top surface of which is fixed to the bottom surface of the hygienic layer. On the other hand, the bottom surface of the adhesive layer is detachable from the top surface of the hygienic layer of another cover sheet of the plurality of cover sheets. Each of the cover sheets of the present invention includes a non-adhesive portion, and the non-adhesive portion is formed on an edge of each of the cover sheet and includes only the hygienic layer and does not include the adhesive layer. Each of the cover sheets placed on top can be removed from the remaining of the cover sheets by pulling the non-adhesive portion off when the cover sheet becomes contaminated.

Accordingly, by pulling the single cover sheet off after use and using another new cover sheet every time, the automobile can be maintained clean and hygienic with convenience, and the risk of transferring germs or pathogens through contact can be minimized. Furthermore, the hygienic cover of the present invention facilitates effortless cleaning of the interior of the automobile, even after riding with pets such as dogs or cats. Additionally, the multiple cover sheets of the hygienic cover of the present invention allows for prolonged and enduring utilization.

The various embodiments of the hygienic cover of the present invention will be explained referring to FIGS. 1A to 13C, but the scope of the present invention is not limited thereto.

Figure 1B:
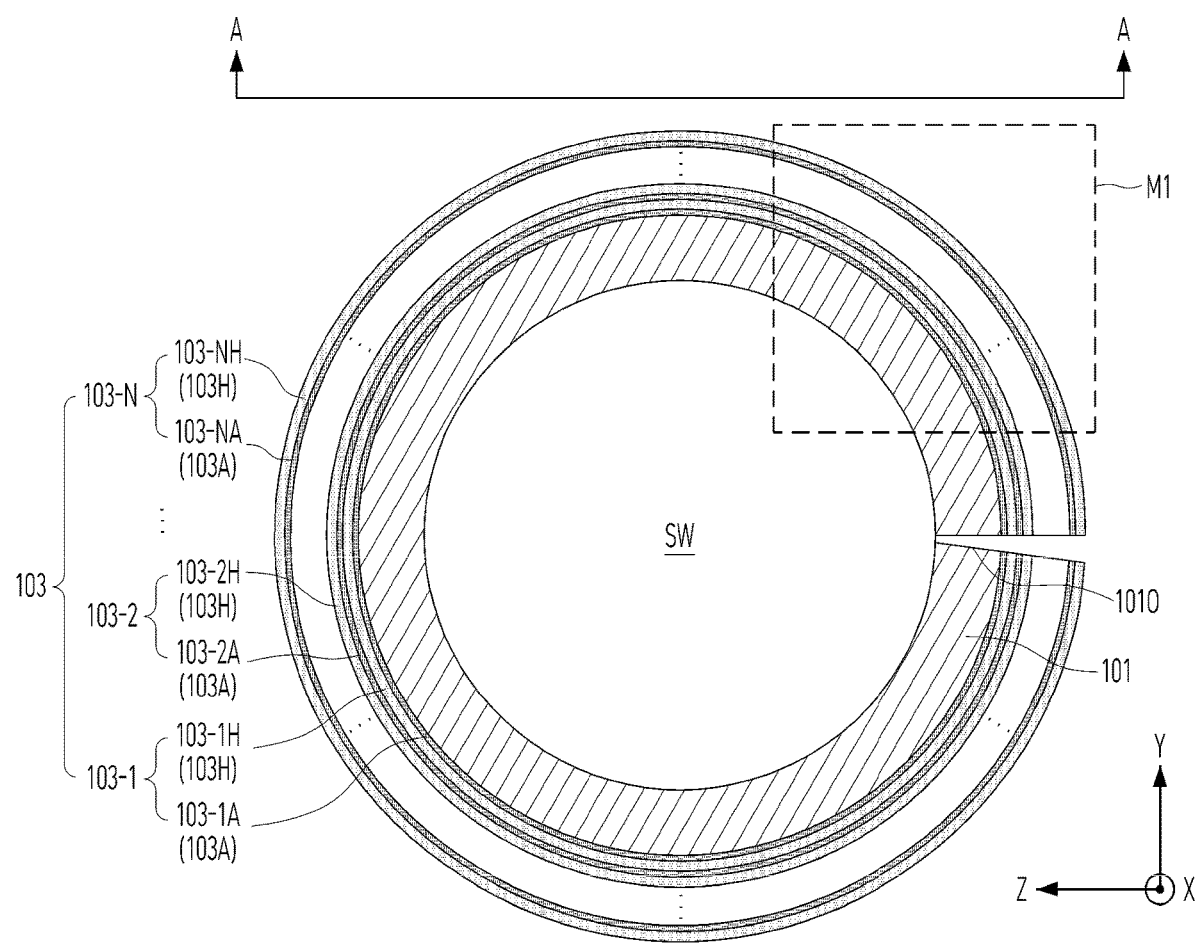
FIG. 1B is a cross sectional view of the hygienic cover 100 cut along a line A-A of FIG. 1A according to one embodiment of the present invention.
Figure 1C:
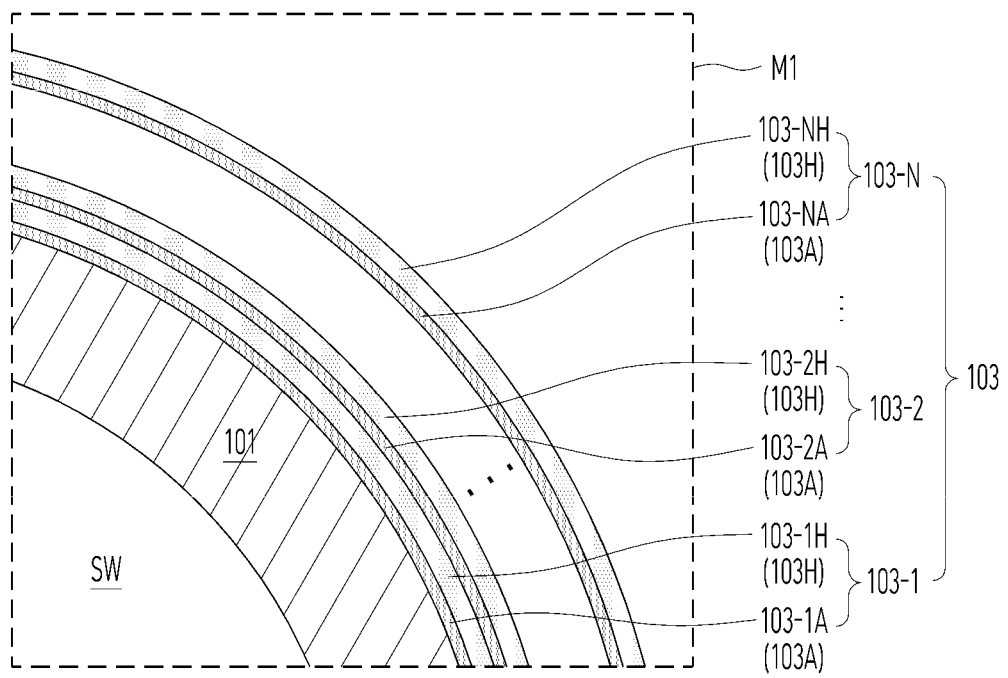
FIG. 1C is a magnified view M1 of the hygienic cover 100 of FIG. 1A according to one embodiment of the present invention.

FIG. 1A is a front view illustrating a hygienic cover 100 that covers a steering wheel SW of an automobile according to one embodiment of the present invention. FIG. 1B is a cross sectional view of the hygienic cover 100 cut along a line A-A of FIG. 1A according to one embodiment of the present invention. FIG. 1C is a magnified view M1 of the hygienic cover 100 of FIG. 1A according to one embodiment of the present invention.

Referring to FIGS. 1A to 1C, a hygienic cover 100 that covers a steering wheel SW of an automobile with which the hands of a driver are in contact, comprises: a base cover 101 and a plurality of cover sheets 103 stacked on top of one another.

The base cover 101 has a circular channel shape fitting over the steering wheel SW and having an opening 1010 along an inner circumference of the circular channel shape to receive the steering wheel SW. The circular channel shape of the base cover 101 has the top surface forming an exterior surface of the base cover 101 and a bottom surface forming an interior surface of the base cover 101 which is directly in contact with an exterior surface of the steering wheel SW. The base cover 101 may be made of anti-bacterial nano silicone but is not limited thereto. The anti-bacterial nano silicone may be a silicone material including anti-bacterial nanoparticles.

The cover sheet 103 is plural, and the plurality of the cover sheets 103-1, 103-2, . . . , 103-N are stacked on top of one another. Each of the cover sheets 103 includes a hygienic layer 103H and an adhesive layer 103A, and the top surface of adhesive layer 103A is fixed to the bottom surface of the hygienic layer 103H. On the other hand, the bottom surface of the adhesive layer 103A is detachable from the top surface of the base cover 101 or the hygienic layer 103H of another cover sheet 103 of the plurality of cover sheets 103. In this case, the top surface of the hygienic layer 103H may be more smooth than the bottom surface of the hygienic cover 103H. Therefore, the adhesive layer 103A of the cover sheet 103 on top can be easily detachable from the top surface of the hygienic cover 103H of another cover sheet

103. The bottom one 103-1 of the stacked cover sheets 103 is attached onto the top surface of the base cover 101.

Specifically, the first cover sheet 103-1, which is the bottom one of the stacked cover sheets 103, includes a hygienic layer 103-1H and an adhesive layer 103-1A fixed to the bottom surface of the hygienic layer 103-1H. The adhesive layer 103-1A is attached to the top surface, or the exterior surface, of the base cover 101. The adhesive layer 103-1A may be detachable from the base cover 101. The second cover sheet 103-2, which is placed on the first cover sheet 103-1, includes a hygienic layer 103-2H and an adhesive layer 103-2A fixed to the bottom surface of the hygienic layer 103-2H. The adhesive layer 103-2A of the second cover sheet 103-2 can be easily detachable and taken off from the first cover sheet 103-1. Likewise, the Nth cover sheet 103-N also has a hygienic layer 103-NH and an adhesive layer 103-NA fixed to the bottom surface of the hygienic layer 103-NH and can be easily detachable and taken off from the remaining stacked cover sheets 103. In some embodiments, the number of the cover sheets 103-1, 103-2, . . . , 103-N may be 60 but is not limited thereto. The number of the cover sheets 103-1, 103-2, . . . , 103-N may be more than 60 or less than 60.

The cover sheet 103 may have at least one cut-out portion 1030 along an edge of the cover sheet 103 so that the cover sheet 103 can wrap a three dimensional structure of the base cover 101.

The cover sheet 103 may be made of at least one of fabric or paper but is not limited thereto. Each of the cover sheet 103 may further contain at least one of a sterilizing agent, an antimicrobial agent, an air freshener, and other material to improve cleanliness and hygiene inside the automobile. In addition, each of the cover sheet 103 may have different colors and designs.

Figure 1D:
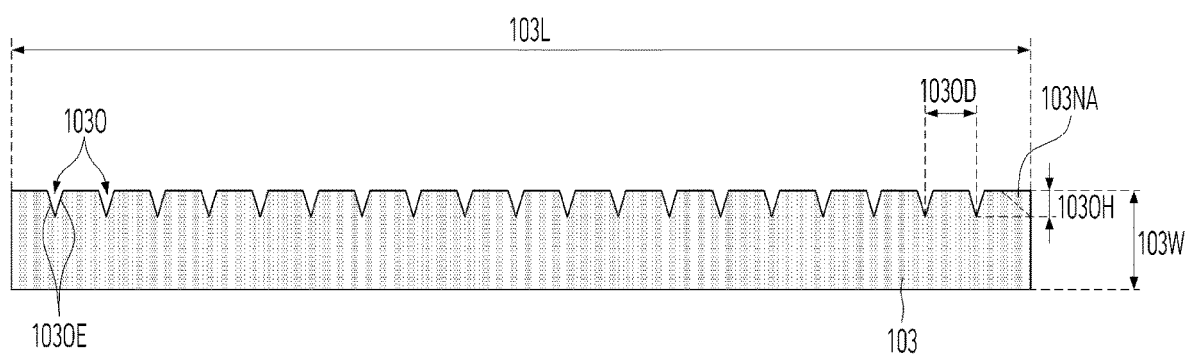
FIG. 1D is a front view of a cover sheet 103 of the hygienic cover 100 of FIG. 1 when it is spread out in a flat plane according to one embodiment of the present invention.

FIG. 1D is a front view of the cover sheet 103 of the hygienic cover 100 of FIG. 1 when it is spread out in a flat plane according to one embodiment of the present invention. FIG. 1E is a front view of a cover sheet 103' of the hygienic cover 100 of FIG. 1 when it is spread out in a flat plane according to another embodiment of the present invention. FIG. 1F is a cross sectional view of the hygienic cover 100 cut along a line B-B of FIG. 1A according to one embodiment of the present invention.

Figure 1E:
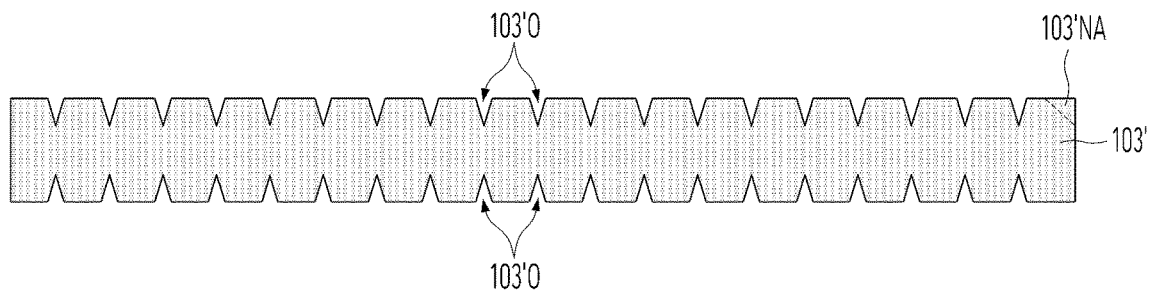
FIG. 1E is a front view of a cover sheet 103' of the hygienic cover 100 of FIG. 1 when it is spread out in a flat plane according to another embodiment of the present invention.
Figure 1F:
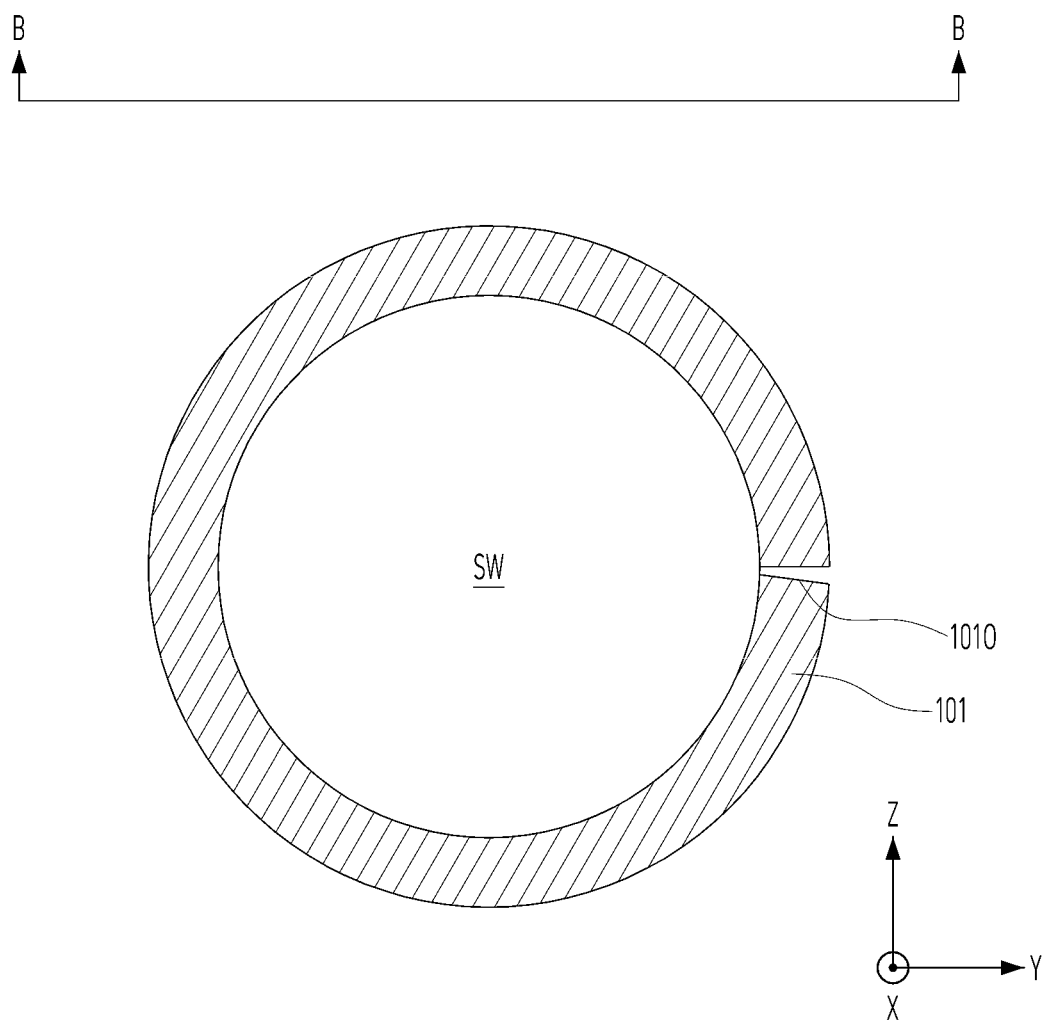
FIG. 1F is a cross sectional view of the hygienic cover 100 cut along a line B-B of FIG. 1A according to one embodiment of the present invention.

Referring to FIGS. 1A and 1F together, the circumference 103L of the cover sheet 103 placed on the base cover 101 may be shorter than that of the base cover 101, and thus a portion 103E of the base cover 101 may be exposed to the outside. As shown in FIG. 1F, the cross section cut along the line B-B shows that only the base cover 101 is placed on the steering wheel SW. Since the base cover 101 may be made of anti-bacterial material such as nano silicone, this exposed portion 103E also acts as prevention of contamination from germs or pathogens.

However, the present invention is not limited to this structure. In other embodiments, the circumference 103L of the cover sheet 103 may be the same or longer than that of the base cover 101; accordingly, the base cover 101 may not be exposed to the outside.

Meanwhile, referring to FIGS. 1A and 1D, when each of the cover sheets 103 is spread out in a flat plane, the cover sheets 103 has a rectangular shape with a plurality of triangular cut-out portions 1030 formed along the edge of the cover sheet 103. These triangular cut-out portions 1030 allow the cover sheet 103 having a flat surface to wrap a three dimensional structure of the base cover 101. The rectangular shaped cover sheet 103 is placed on the base cover 101 in a way that two edges 1030E of the triangular cut-out portion 1030 meets each other and forms a meeting line 1030M so that the rectangular shape wraps the exterior surface of the base cover 101.

The triangular cut-out portion 1030 may be plural, and the plurality of the triangular cut-out portion 1030 may be formed at regular intervals. The length 103L and width 103W of the cover sheet 103, the depth 1030H and the interval of the triangular cut-out portion 1030 may be various according to the steering wheel.

The triangular cut-out portions 103'O shown in FIG. 1D are formed along one edge of the cover sheet 103, but the present invention is not limited thereto. As shown in FIG. 1E, a plurality of the triangular cut-out portions 103'O may be formed along both edges of a cover sheet 103'.

Figure 1G:
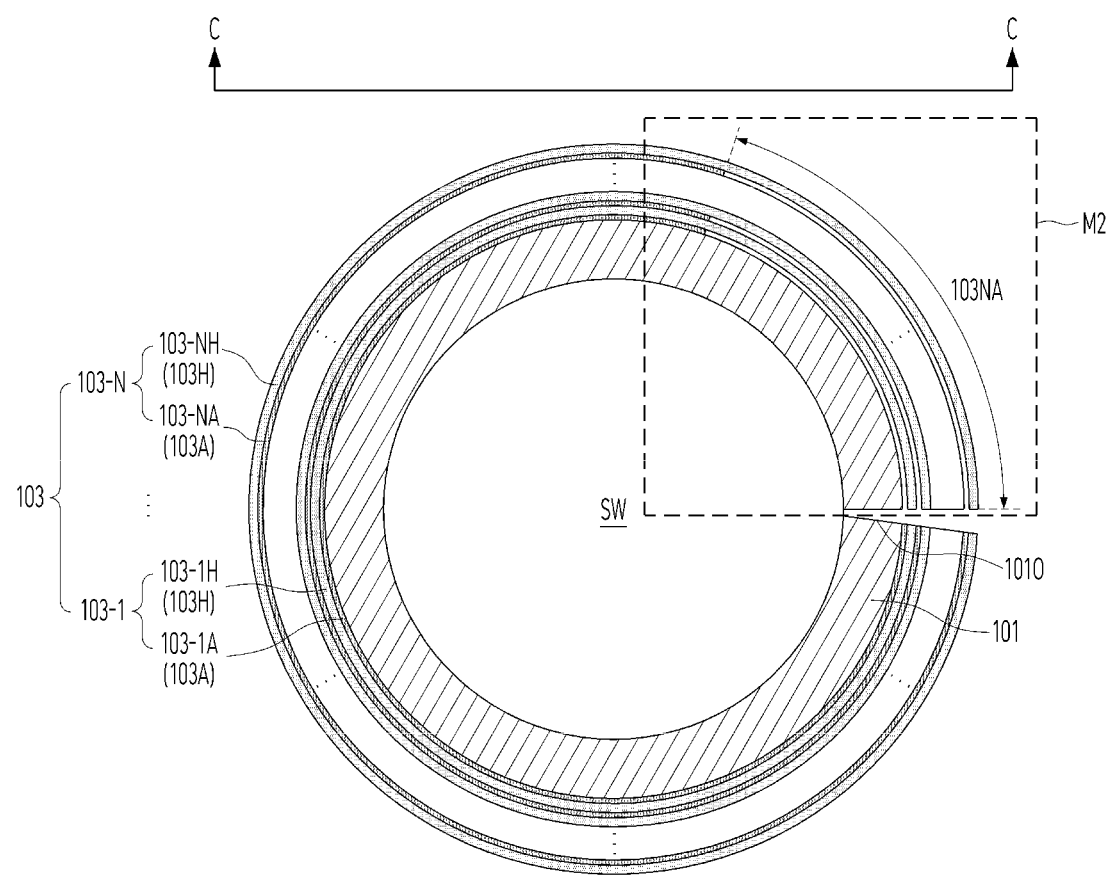
FIG. 1G is a cross sectional view of the hygienic cover 100 cut along a line C-C of FIG. 1A according to one embodiment of the present invention.
Figure 1H:
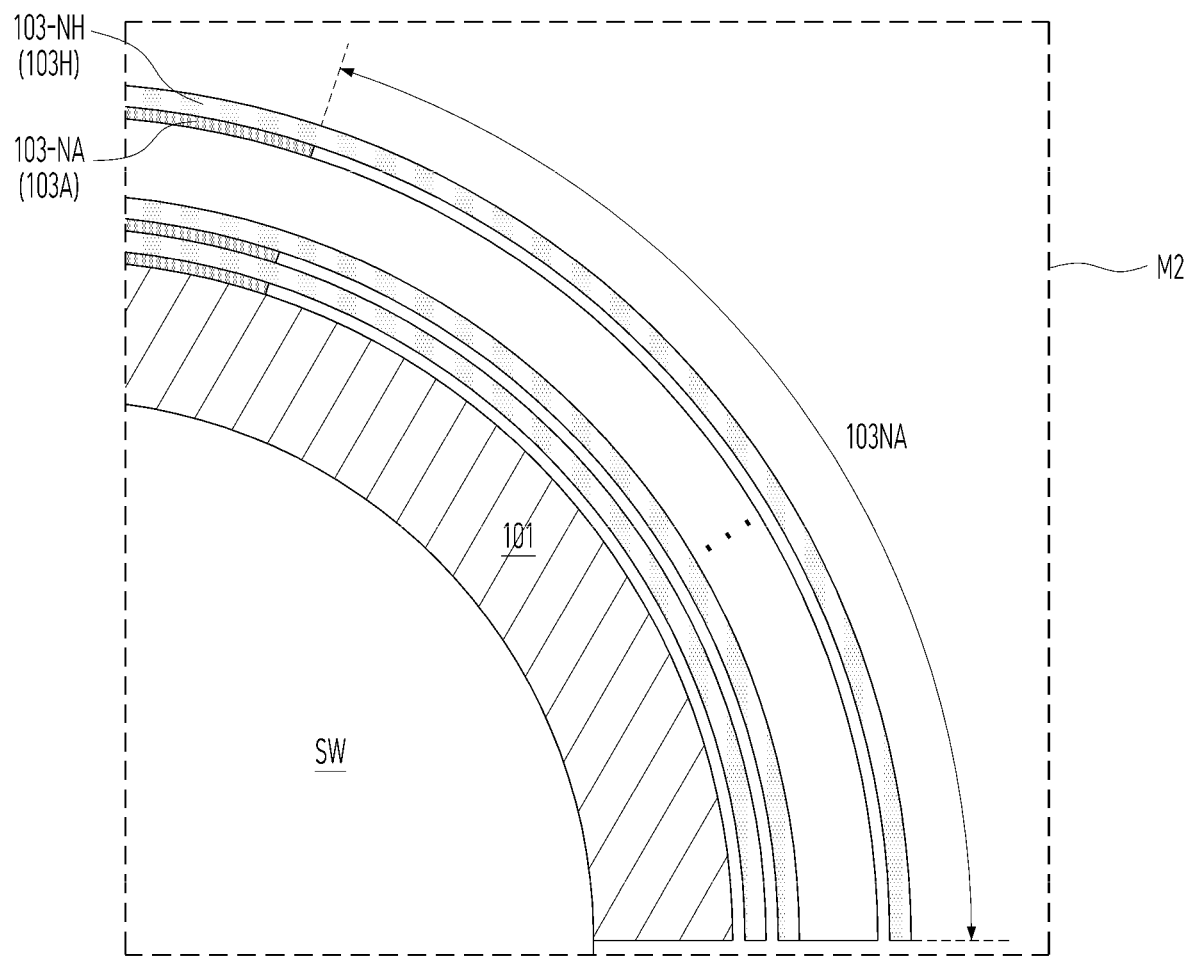
FIG. 1H is a magnified view M2 of the hygienic cover 100 of FIG. 1G according to one embodiment of the present invention.
Figure 1I:
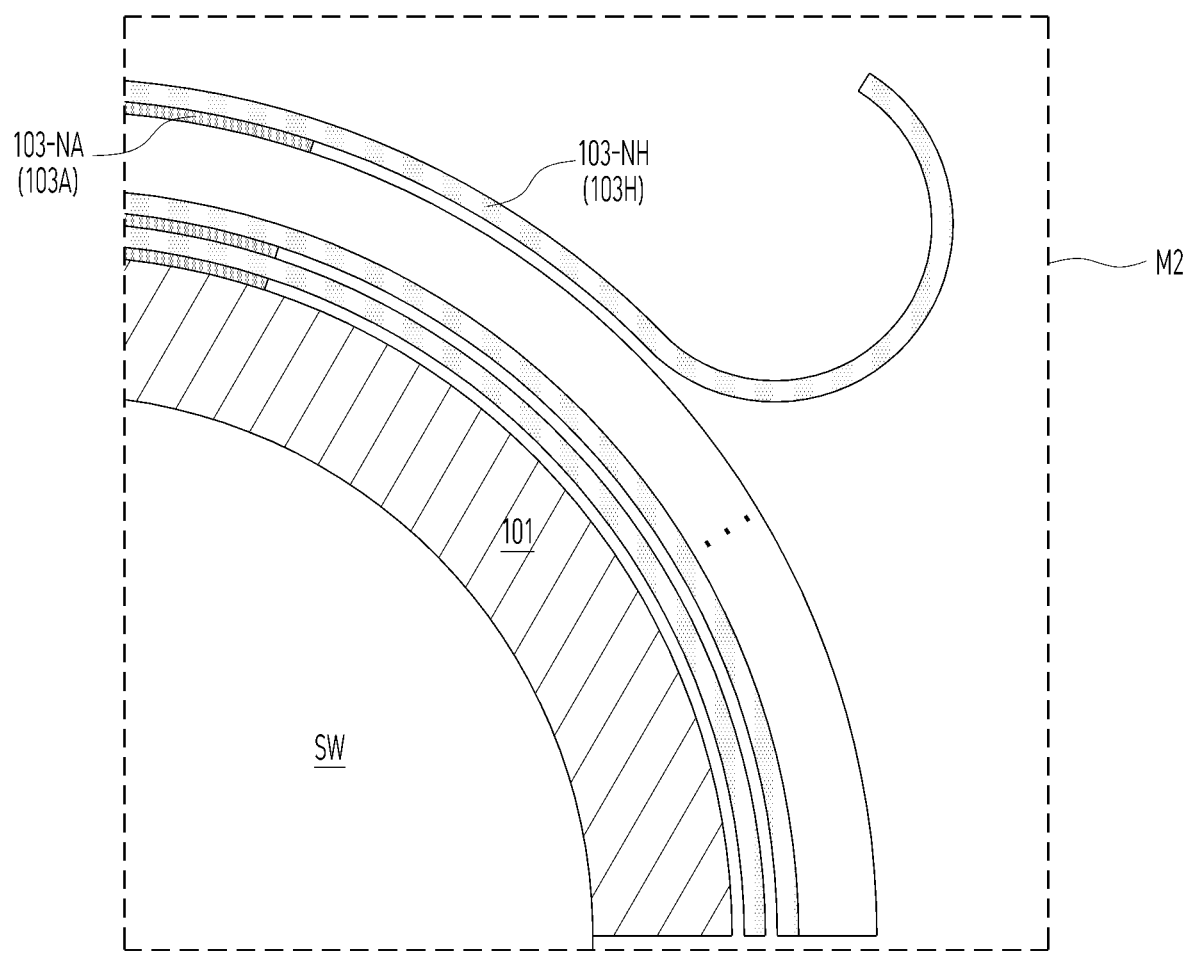
FIG. 1I is a magnified view M2 of the hygienic cover 100 of FIG. 1G when a cover sheet 103 of the hygienic cover 100 placed on top is being removed by pulling a non-adhesive portion 103NA off according to one embodiment of the present invention.

FIG. 1G is a cross sectional view of the hygienic cover 100 cut along a line C-C of FIG. 1A according to one embodiment of the present invention. FIG. 1H is a magnified view M2 of the hygienic cover 100 of FIG. 1G according to one embodiment of the present invention. FIG. 1I is a magnified view M2 of the hygienic cover 100 of FIG. 1G when a cover sheet 103 of the hygienic cover 100 placed on top is being removed by pulling a non-adhesive portion 103NA off according to one embodiment of the present invention.

Referring to FIGS. 1A, 1G to 1I, each of the cover sheets 103 includes a non-adhesive portion 103NA. The non-adhesive portion 103NA is formed on an edge of each of the cover sheet 103 and includes only the hygienic layer 103H and does not include the adhesive layer 103A. Accordingly, each of the cover sheets 103 placed on top can be easily taken off and removed from the remaining of the cover sheets 103 by pulling the non-adhesive portion 103NA off when the cover sheet 103 becomes contaminated. Since the adhesive layer 103A of the cover sheet 103 can be detachable from the top surface of the hygienic layer 103H of another cover sheet 103, the entire cover sheet 103 on top can be taken off easily once a user grabs and pull off the non-adhesive portion 103NA. The non-adhesive portion 103NA may be formed at least one corner of the rectangular shaped cover sheet 103.

Figure 2:
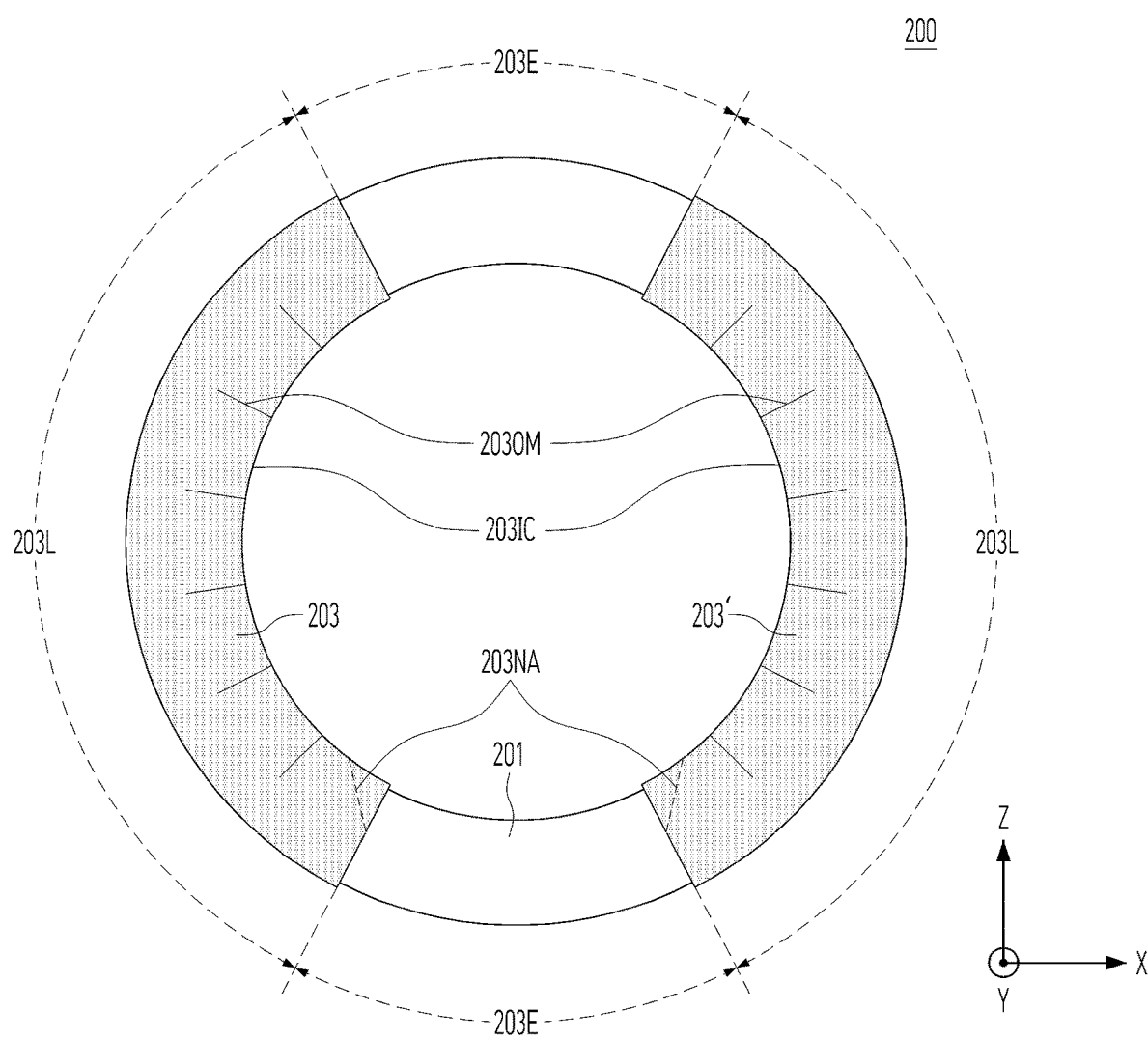
FIG. 2 is a front view illustrating a hygienic cover 200 that covers a steering wheel SW of an automobile according to another embodiment of the present invention.

FIG. 2 is a front view illustrating a hygienic cover 200 that covers a steering wheel SW of an automobile according to another embodiment of the present invention. The hygienic covers 200 is similar to the hygienic covers 100 in FIGS. 1A to 1I, but there is a structural difference in that the hygienic cover 200 of FIG. 2 has multiple sets of a plurality of cover sheets 203, 203 while the hygienic cover 100 of FIGS. 1A to 1I has a single set of the plurality of cover sheet 103.

Referring to FIG. 2, the hygienic cover 200 has two set of a plurality of cover sheets 203 on the left side and the right side, respectively. In other words, each cover sheet 203 which is in a same level of the stacked cover sheet 203 may include two pieces 203, 203', and the two pieces may be placed on the left and the right portions of the base cover 201 corresponding to the left and right sides of the steering wheel SW, respectively. In this case, each of the pieces of the cover sheet 203, 203' on the left and the right portions has the non-adhesive portion 203NA, respectively, and thus each piece can be taken off by pulling off the respective non-adhesive portion 203NA.

The base cover 201 may be exposed in portions 203E between the two pieces or two sets of cover sheets 203, 203' but is not limited thereto. In other embodiments, the length of each of the cover sheet 203, 203' may be long enough to cover the exterior surface of the entire base cover 201.

Hereafter, embodiments of hygienic covers 300, 400, 500, 600, 700, 800, 900, 1000, 1100, 1200, 1300 applied to a gear shift knob GSK, a parking brake handle PBH, a seat S, a floor mat, an armrest mat AM of an automobile will be described. Each hygienic cover 300 to 1300 has a base cover and a plurality of cover sheets placed on the base cover, and each cover sheet includes a hygienic layer and an adhesive layer as illustrated in the hygienic covers 100, 200 of FIGS. 1B and 1C. In addition, each hygienic layer includes a non-adhesive portion as illustrated in the non-adhesive portion 103NA of FIGS. 1A, 1D, 1G, 1H, 1I, 2. The plurality of cover sheets 303, 403, 503, 603, 703, 803, 903, 1003, 1103, 1203, 1303 of each of the hygienic covers 300 to 1300 is shown as a single layer in FIGS. 3A to 13C for simplification of drawings, but each of the plurality of cover sheets 303 to 1303 has the same stack structure as the plurality of the cover sheet 103 illustrated in FIGS. 1B and 1C. A detailed description for a component having the same function as the component described above will be omitted.

Figure 3A:
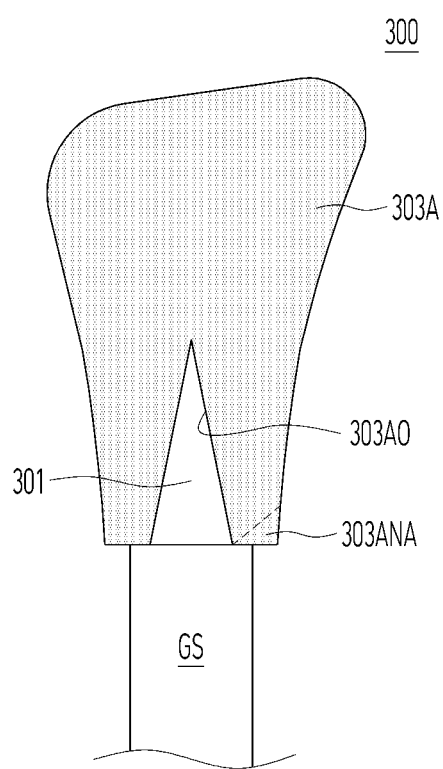
FIG. 3A is a side view illustrating a hygienic cover 300 that covers a gear shift knob GSK of an automobile according to one embodiment of the present invention.
Figure 3B:
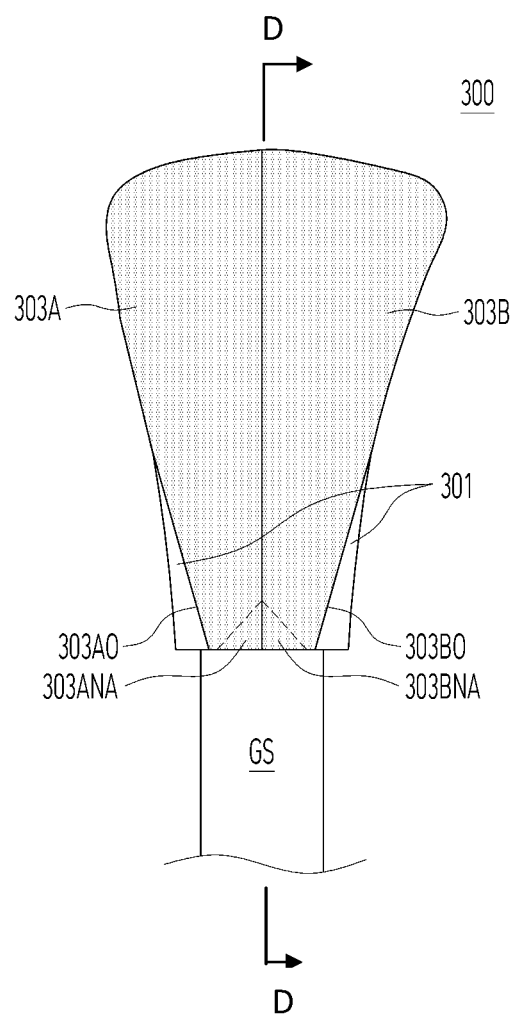
FIG. 3B is a front view of hygienic cover 300 of FIG. 3A according to one embodiment of the present invention.
Figure 3C:
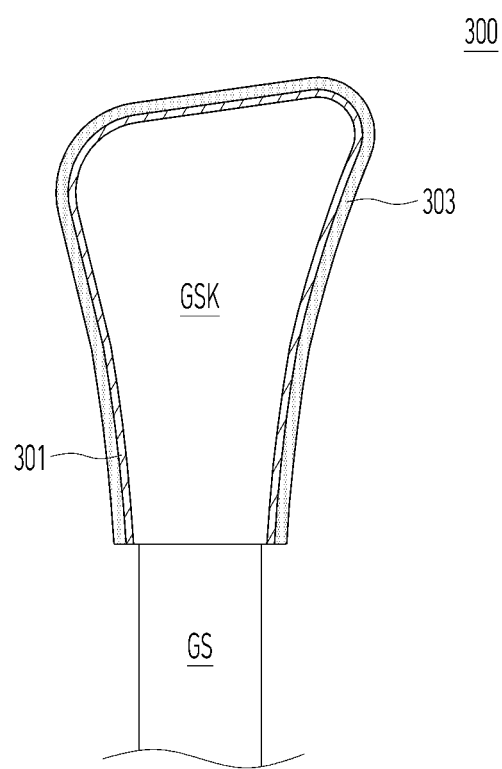
FIG. 3C is a cross sectional view of the hygienic cover 300 cut along a line D-D of FIG. 3B according to one embodiment of the present invention.

FIG. 3A is a side view illustrating a hygienic cover 300 that covers a gear shift knob GSK of an automobile according to one embodiment of the present invention. FIG. 3B is a front view of hygienic cover 300 of FIG. 3A according to one embodiment of the present invention. FIG. 3C is a cross sectional view of the hygienic cover 300 cut along a line D-D of FIG. 3B according to one embodiment of the present invention.

Referring to FIGS. 1C, 3A to 3C, the hygienic cover 300 that covers the gear shift knob GSK of an automobile with which the hand of a driver is in contact, comprises: a base cover 301 and a plurality of cover sheets 303A stacked on top of one another. The detailed structure of the plurality of the cover sheets 303A is the same as that of the plurality of the cover sheets 103 in FIG. 1C.

The base cover 301 has a pocket shape fitting over the gear shift knob GSK and having an opening in the bottom thereof to receive a gear shift stick GS to which the gear shift knob GSK is connected. The pocket shape of the base cover 301 has the top surface forming an exterior surface of the base cover 301 and a bottom surface forming an interior surface of the base cover 301 which is directly in contact with an exterior surface of the gear shift knob GSK. The base cover 301 may be made of anti-bacterial nano silicone but is not limited thereto.

As described above referring to FIGS. 1A to 1I, the plurality of the cover sheets 303A are stacked on top of one another. Each of the cover sheets 303A includes a hygienic layer and an adhesive layer fixed to the bottom surface of the hygienic layer. The bottom surface of the adhesive layer is easily detachable from the top surface of the base cover 301 and the hygienic layer of another cover sheet 303A.

Each of the cover sheets 303A includes a non-adhesive portion 303ANA. The non-adhesive portion 303ANA is formed on an edge of each of the cover sheet 303A and includes only the hygienic layer and does not include the adhesive layer as described in FIGS. 1G to 1I. Accordingly, each of the cover sheets 303A placed on top can be easily taken off and removed from the remaining of the cover sheets 303A by pulling the non-adhesive portion 303ANA off when the cover sheet 303A becomes contaminated.

The cover sheet 303A may have a triangular cut-out portion 303AO to wrap a three dimensional structure of the pocket shaped base cover 301, and the base cover 301 may be exposed to the outside through this triangular cut-out portion 303AO of the cover sheets 303A.

The hygienic layer of the cover sheet 303A may be made of at least one of fabric or paper but is not limited thereto.

Meanwhile, the hygienic cover 300 may have multiple sets 303A, 303B of a plurality of cover sheets. Thus, as shown in FIG. 3B, the two sets 303A, 303B of a plurality of cover sheets may be respectively placed on the left side and the right side of the base cover 301. Each of two sets 303A, 303B of a plurality of cover sheets may have the same side view as illustrated in FIG. 3A. Each set 303A, 303B of a plurality of cover sheets may have respective the non-adhesive portion 303ANA, 303BNA and the triangular cut-out portion 303AO, 303BO. In other words, each cover sheet which is in a same level of the stacked cover sheets 303A, 303B may include multiple pieces, and each piece of the cover sheet 303A, 303B may be placed on different portions of the base cover 301 and has the non-adhesive portion 303ANA, 303BNA, respectively.

Figure 4A:
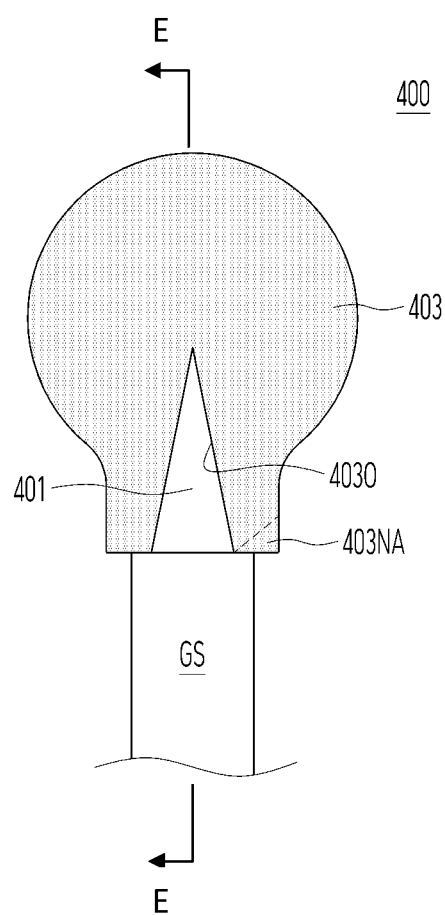
FIG. 4A is a side view illustrating a hygienic cover 400 that covers a gear shift knob GSK of an automobile according to another embodiment of the present invention.
Figure 4B:
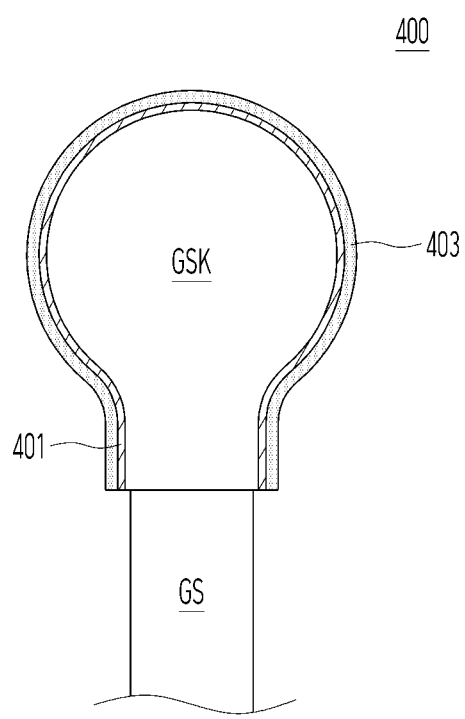
FIG. 4B is a cross sectional view of the hygienic cover 400 cut along a line E-E of FIG. 4A according to one embodiment of the present invention.

FIG. 4A is a side view illustrating a hygienic cover 400 that covers a gear shift knob GSK of an automobile according to another embodiment of the present invention. FIG. 4B is a cross sectional view of the hygienic cover 400 cut along a line E-E of FIG. 4A according to one embodiment of the present invention.

The hygienic cover 400 of FIGS. 4A and 4B is similar to the hygienic cover 300 of FIGS. 3A to 3C and has a difference only in a shape according to the different structure of the gear shift knob GSK.

Referring to FIGS. 4A and 4B, the hygienic cover 400 comprises a base cover 401 having a spherical shaped pocket and a plurality of cover sheets 403 attached on the base cover 401. Each of the cover sheets 403 may have a triangular cut-out portion 403O to wrap a three dimensional structure of the base cover 401. Each of the cover sheets 403 has a non-adhesive portion 403NA on the edge of the cover sheet 403. In addition, the hygienic cover 400 may have multiple sets of a plurality of cover sheets.

Figure 5A:
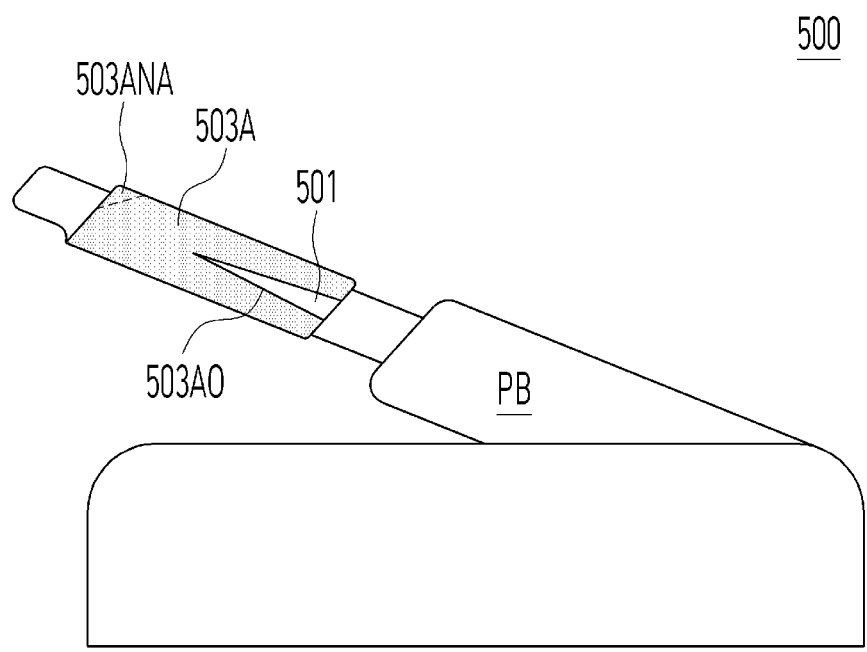
FIG. 5A is a side view illustrating a hygienic cover 500 that covers a parking brake handle PBH of an automobile according to one embodiment of the present invention.
Figure 5B:
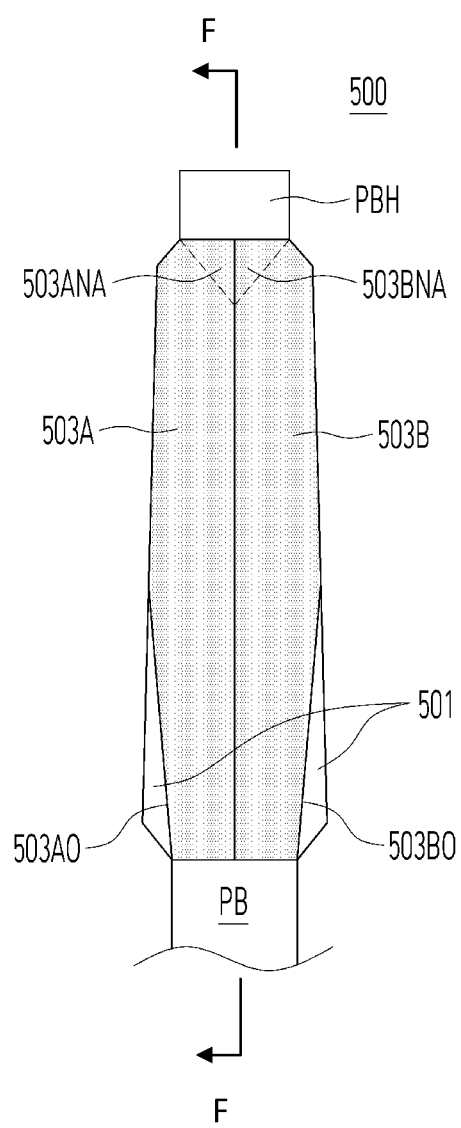
FIG. 5B is a front view of hygienic cover 500 of FIG. 5A according to one embodiment of the present invention.
Figure 5C:
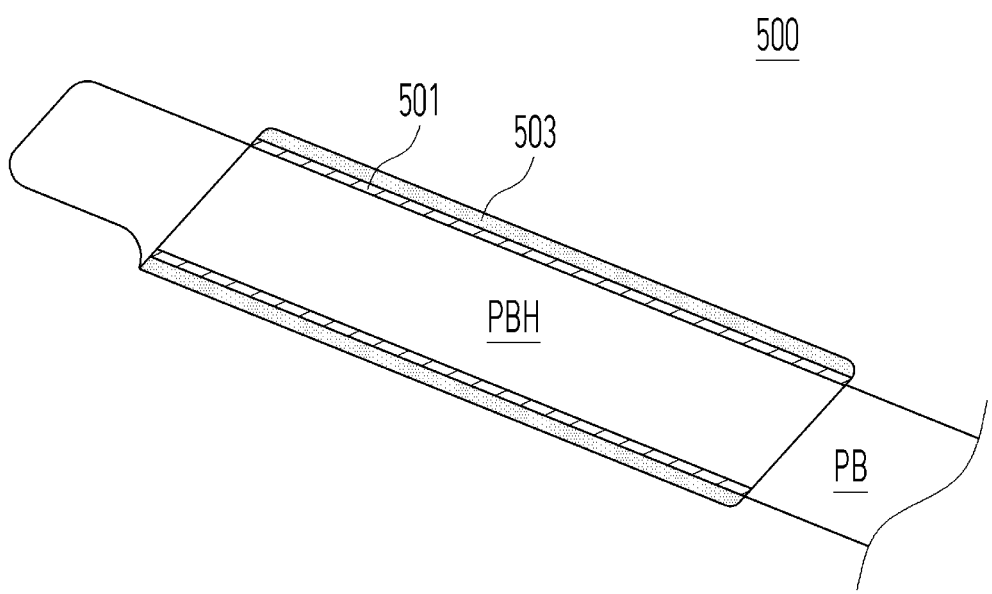
FIG. 5C is a cross sectional view of the hygienic cover 500 cut along a line F-F of FIG. 5B according to one embodiment of the present invention.

FIG. 5A is a side view illustrating a hygienic cover 500 that covers a parking brake handle PBH of an automobile according to one embodiment of the present invention. FIG. 5B is a front view of hygienic cover 500 of FIG. 5A according to one embodiment of the present invention. FIG. 5C is a cross sectional view of the hygienic cover 500 cut along a line F-F of FIG. 5B according to one embodiment of the present invention.

Referring to FIGS. 1C, 5A to 5C, the hygienic cover 500 that covers the parking brake handle PBH of an automobile with which the hand of a driver is in contact, comprises: a base cover 501 and a plurality of cover sheets 503A stacked on top of one another. The detailed structure of the plurality of the cover sheets 503A is the same as that of the plurality of the cover sheets 103 in FIG. 1C.

The base cover 501 has a cylinder shape fitting over the parking brake handle PBH and having an opening in the top and the bottom thereof to receive a parking brake handle PBH and expose the top of the parking brake handle PBH. The cylinder shape of the base cover 501 has the top surface forming an exterior surface of the base cover 501 and a bottom surface forming an interior surface of the base cover 501 which is directly in contact with an exterior surface of the parking brake handle PBH. The base cover 501 may be made of anti-bacterial nano silicone but is not limited thereto.

As described above referring to FIGS. 1A to 1I, the plurality of the cover sheets 503A are stacked on top of one another. Each of the cover sheets 503A includes a hygienic layer and an adhesive layer fixed to the bottom surface of the hygienic layer. The bottom surface of the adhesive layer is easily detachable from the top surface of the base cover 501 and the hygienic layer of another cover sheet 503A.

Each of the cover sheets 503A includes a non-adhesive portion 503ANA. The non-adhesive portion 503ANA is formed on an edge of each of the cover sheet 503 and includes only the hygienic layer and does not include the adhesive layer as described in FIGS. 1G to 1I. Accordingly, each of the cover sheets 503A placed on top can be easily taken off and removed from the remaining of the cover sheets 503A by pulling the non-adhesive portion 503ANA off when the cover sheet 503A becomes contaminated.

The cover sheet 503A may have a triangular cut-out portion 503AO to wrap a three dimensional structure of the cylinder shaped base cover 501, and the base cover 501 may be exposed to the outside through this triangular cut-out portion 503AO of the cover sheets 503A.

The hygienic layer cover of the cover sheet 503A may be made of at least one of fabric or paper but is not limited thereto.

Meanwhile, the hygienic cover 500 may have multiple sets 503A, 503B of a plurality of cover sheets. Thus, as shown in FIG. 5B, the two sets 503A, 503B of a plurality of cover sheets may be respectively placed on the left side and the right side of the base cover 501. Each of two sets 503A, 503B of a plurality of cover sheets may have the same side view as illustrated in FIG. 5A. Each set 503A, 503B of a plurality of cover sheets may have respective the non-adhesive portion 503ANA, 503BNA and the triangular cut-out portion 503AO, 503BO. In other words, each cover sheet which is in a same level of the stacked cover sheets 503A, 503B may include multiple pieces, and each piece of the cover sheet 503A, 503B may be placed on different portions of the base cover 501 and has the non-adhesive portion 503ANA, 503BNA, respectively.

Figure 6A:
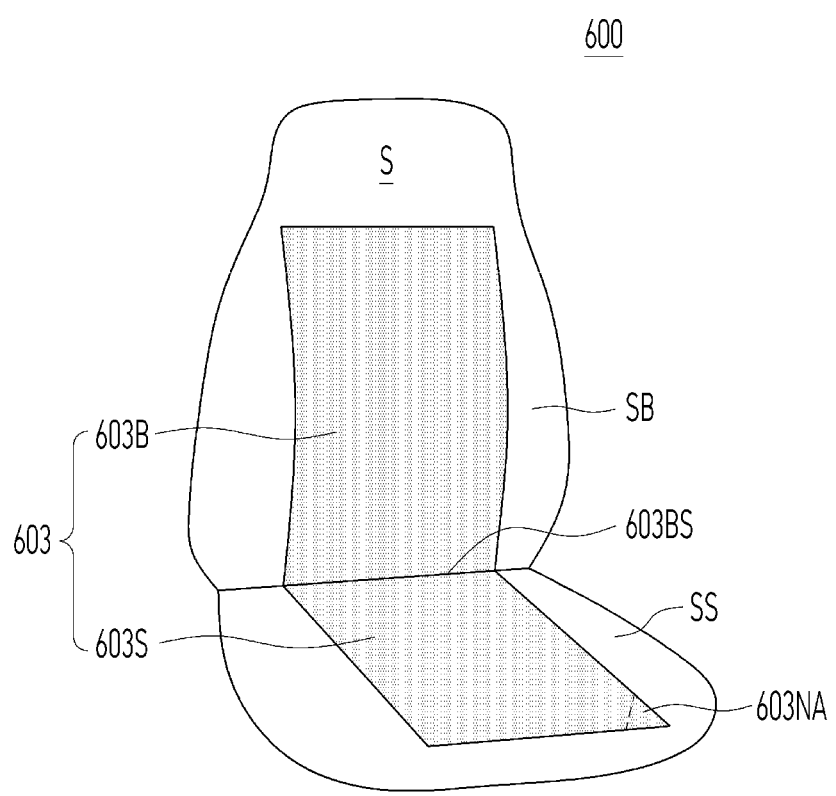
FIG. 6A is a perspective view illustrating a hygienic cover 600 that covers a seat S of an automobile according to one embodiment of the present invention.
Figure 6B:
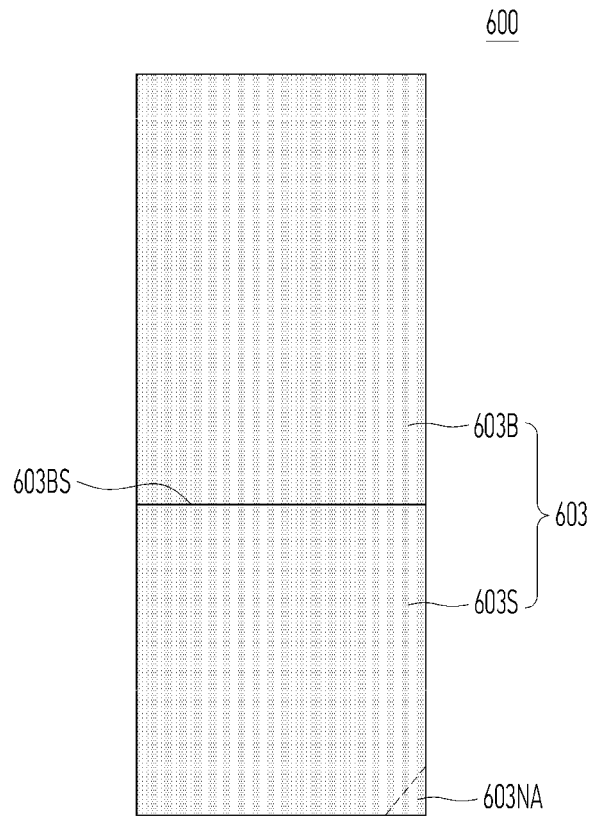
FIG. 6B is a front view of the hygienic cover 600 of FIG. 6A when it is spread out in a flat plane according to one embodiment of the present invention.
Figure 7:
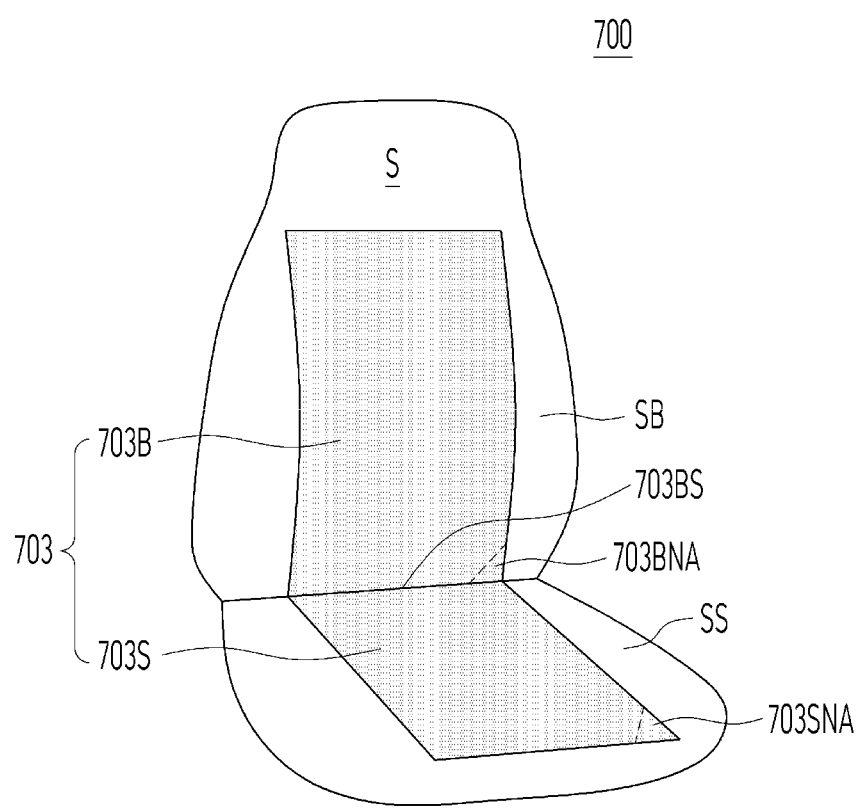
FIG. 7 is a perspective view illustrating a hygienic cover 700 that covers a seat S of an automobile according to another embodiment of the present invention.

FIG. 6A is a perspective view illustrating a hygienic cover 600 that covers a seat S of an automobile according to one embodiment of the present invention. FIG. 6B is a front view of the hygienic cover 600 of FIG. 6A when it is spread out in a flat plane according to one embodiment of the present invention. IG. 6C is a side view of the hygienic cover 600 of FIG. 6A according to one embodiment of the present invention. FIG. 7 is a perspective view illustrating a hygienic cover 700 that covers a seat S of an automobile according to another embodiment of the present invention.

Referring to FIGS. 1C, 6A to 6C, the hygienic cover 600 that covers the seat S of an automobile with which the head, upper and lower body of a driver is in contact, comprises: a base cover 601 and a plurality of cover sheets 603 stacked on top of one another. The detailed structure of the plurality of the cover sheets 603 is the same as that of the plurality of the cover sheets 103 in FIG. 1C.

The base cover 601 has a rectangular shape covering the front area of the seat GSK. Specifically, the base cover 601 has a first rectangular shape resting on a backrest SB of the seat S, and a second rectangular shape connected from the bottom of the first rectangular shape and resting on a seating area SS of the seat S. The base cover 301 may be made of anti-bacterial nano silicone but is not limited thereto.

As described above referring to FIGS. 1A to 1I, the plurality of the cover sheets 603 are stacked on top of one another. Each of the cover sheets 603 includes a hygienic layer and an adhesive layer fixed to the bottom surface of the hygienic layer. The bottom surface of the adhesive layer is easily detachable from the top surface of the base cover 601 and the hygienic layer of another cover sheet 603.

Each cover sheet 603 which is in a same level of the stacked cover sheets 603 covers the first and the second rectangular shape of the base cover 601. The part 603B of the cover sheet 603 covering the first rectangular shape and the part 603S of the cover sheet 603 covering the second rectangular shape may be connected to each other at the boundary 603BS between the backrest SB and the seating area SS.

Each of the cover sheets 603 includes a non-adhesive portion 603NA. The non-adhesive portion 603NA is formed on an edge of each of the cover sheet 603 and includes only the hygienic layer and does not include the adhesive layer as described in FIGS. 1G to 1I. Accordingly, each of the cover sheets 603 placed on top can be easily taken off and removed from the remaining of the cover sheets 603 by pulling the non-adhesive portion 603NA off when the cover sheet 603 becomes contaminated.

The hygienic layer cover of the cover sheet 303 may be made of at least one of fabric or paper but is not limited thereto.

Meanwhile, referring to FIG. 7, the cover sheets 703 may have multiple sets 703B, 703S of a plurality of cover sheets. Thus, the first part 703B and the second part 703S of a plurality of cover sheets may be respectively placed on the first rectangular shape of the base cover 701 and the second rectangular shape of the base cover 701, respectively. Each of the first part 703B and the second part 703S of a plurality of cover sheets may have respective the non-adhesive portion 703BNA, 703SNA. In other words, each cover sheet which is in a same level of the stacked cover sheets 703B, 703S may include multiple pieces, and each piece of the cover sheet 703B, 703S may be placed on different portions of the base cover 701 and has the non-adhesive portion 703BNA, 703SNA, respectively.

Figure 8A:
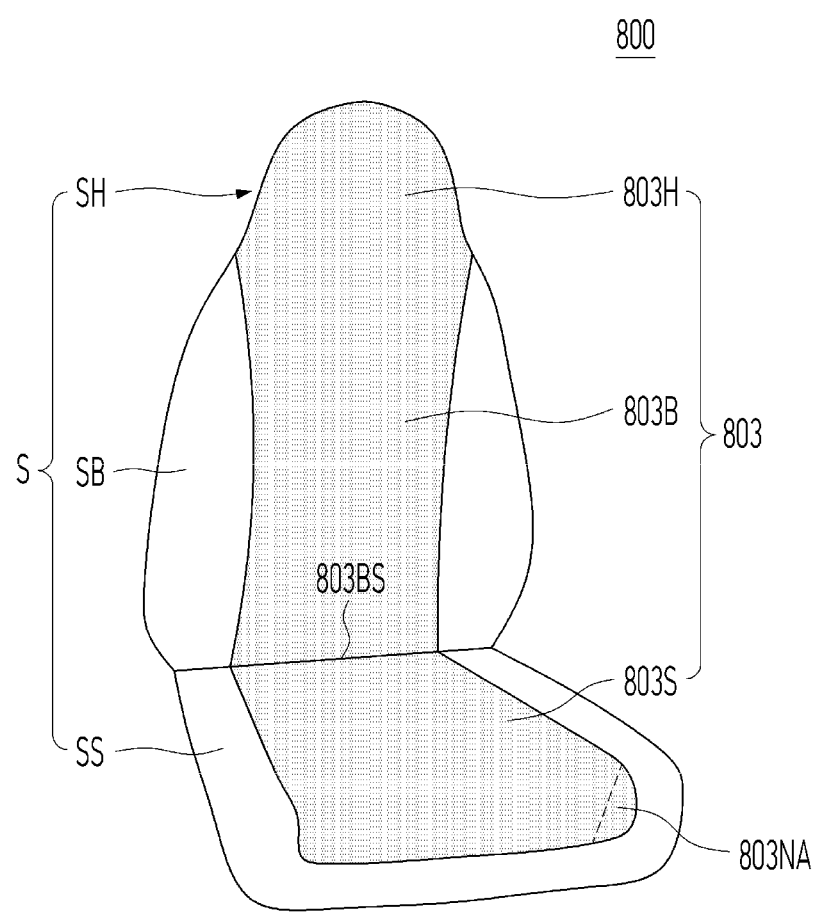
FIG. 8A is a perspective view illustrating a hygienic cover 800 that covers a seat S of an automobile according to another embodiment of the present invention.
Figure 8B:
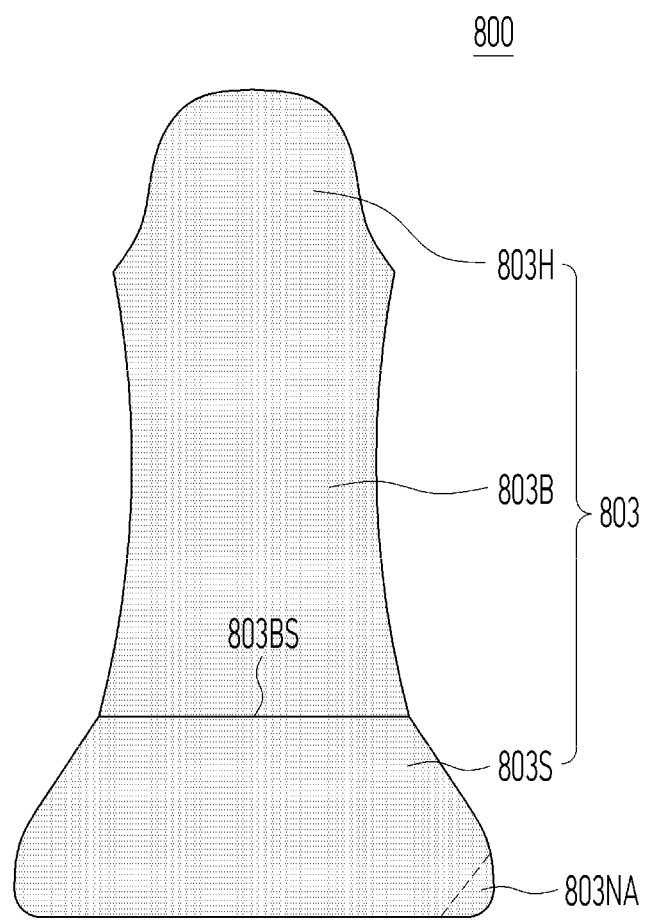
FIG. 8B is a front view of the hygienic cover 800 of FIG. 8A when it is spread out in a flat plane according to one embodiment of the present invention.
Figure 8C:
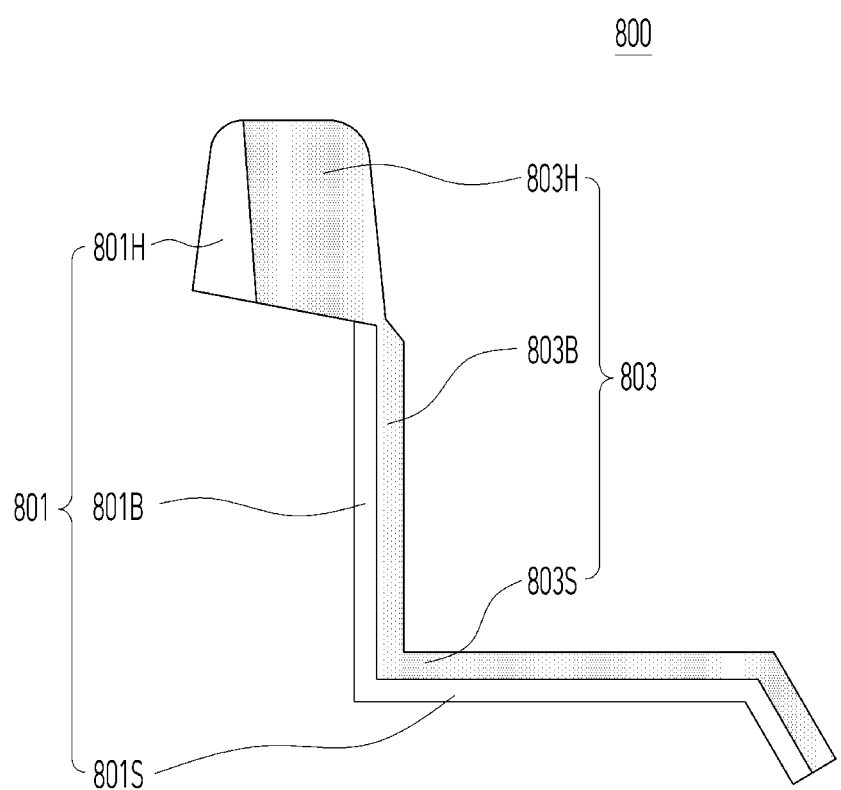
FIG. 8C is a side view of the hygienic cover 800 of FIG. 8A according to one embodiment of the present invention.

FIG. 8A is a perspective view illustrating a hygienic cover 800 that covers a seat S of an automobile according to another embodiment of the present invention. FIG. 8B is a front view of the hygienic cover 800 of FIG. 8A when it is spread out in a flat plane according to one embodiment of the present invention. FIG. 8C is a side view of the hygienic cover 800 of FIG. 8A according to one embodiment of the present invention.

Figure 9:
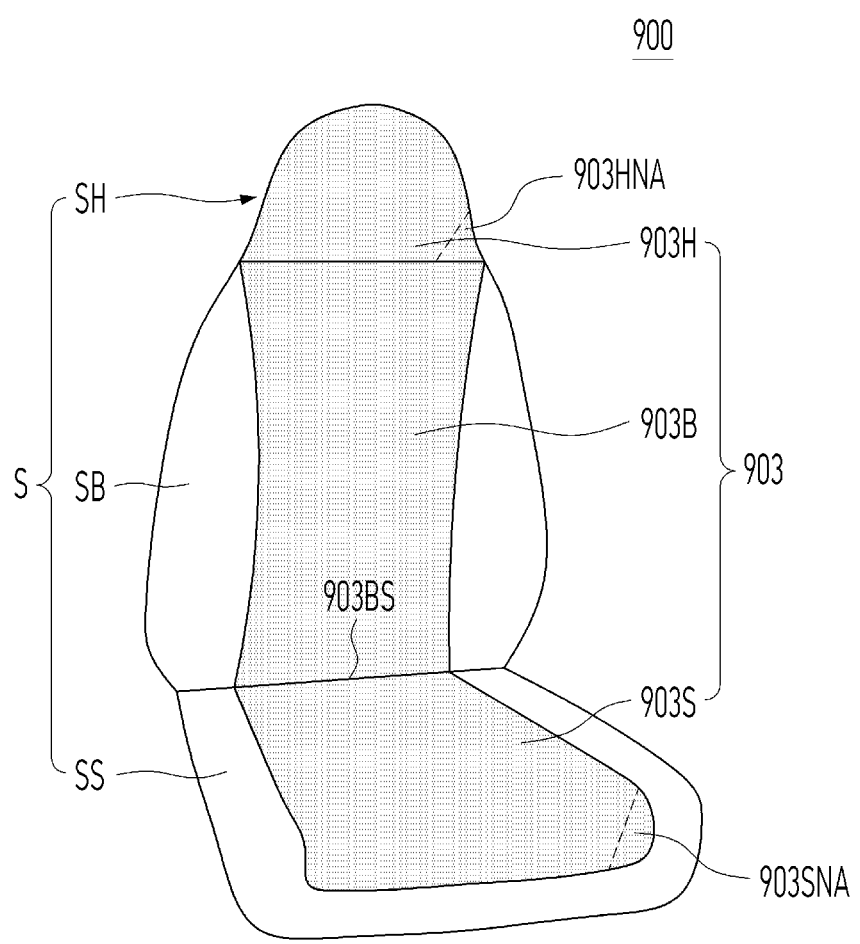
FIG. 9 is a perspective view illustrating a hygienic cover 900 that covers a seat S of an automobile according to another embodiment of the present invention.
Figure 10:
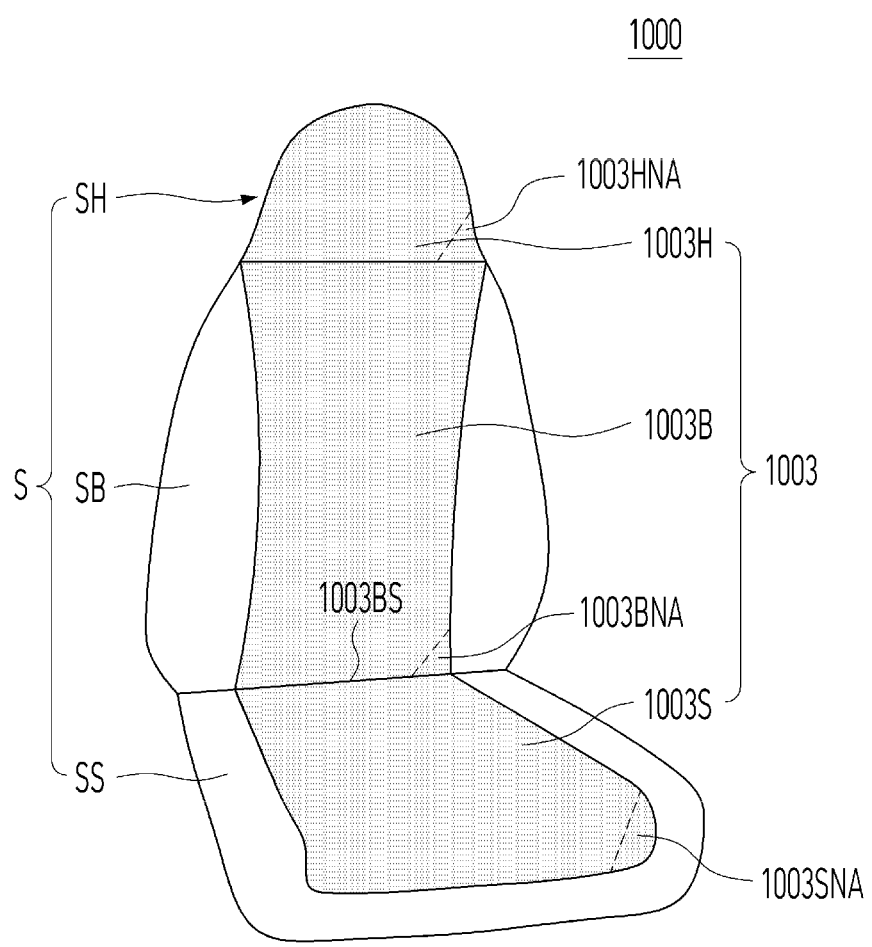
FIG. 10 is a perspective view illustrating a hygienic cover 1000 that covers a seat S of an automobile according to another embodiment of the present invention.

FIG. 9 is a perspective view illustrating a hygienic cover 900 that covers a seat S of an automobile according to another embodiment of the present invention. FIG. 10 is a perspective view illustrating a hygienic cover 1000 that covers a seat S of an automobile according to another embodiment of the present invention.

The hygienic covers 800, 900, 1000 of FIGS. 8A to 10 are similar to the hygienic covers 600, 700 of FIGS. 6A to 7, but there is a structural difference in that the hygienic covers 800, 900, 1000 further covers the headrest SH of the seat S.

Referring to FIGS. 8A to 8C, the hygienic cover 800 that covers the seat S comprises: a base cover 801 and a plurality of cover sheets 803 stacked on top of one another. The detailed structure of the plurality of the cover sheets 803 is the same as that of the plurality of the cover sheets 103 in FIG. 1C.

The base cover 801 includes a hood shape for receiving a headrest SH of the seat S, the first rectangular shape connected from the bottom of the hood shape, and the second rectangular shape.

Each cover sheet 803 which is in a same level of the stacked cover sheets 803 includes a first part 803H covering the hood shape, a second part 803B covering the first rectangular part, and a third part 803S covering the second rectangular part. In some embodiments, the first part 803H of the cover sheet 803 may not cover the back of the hood shape of the base cover 801 with which the head of the driver is not contact. The first, second, and the third part 803H, 803B, 803S of the cover sheet 803 may be connected to each other and in this case, the non-adhesive portion 803NA may be formed at the edge of the third part 803NA but is not limited thereto.

The widths of the hygienic cover 800 may vary in portions corresponding to the headrest SH, the backrest SB, and the seating area SS.

Meanwhile, referring to FIG. 9, the cover sheet 903 may have multiple sets of a plurality of cover sheets: one set 903H and another set 903B, 903S. Thus, a first part 903H of the cover sheet 903 covering the hood shape and a second and third part 903B, 903S of the cover sheet 903 covering the first and the second rectangular shape may be separated from each other. Each of the first part 903H and the second and third part 903B, 903S may have respective the non-adhesive portion 903HNA, 903SNA. In other words, each cover sheet which is in a same level of the stacked cover sheets 903H, 903B, 903S may include multiple pieces, and each piece of the cover sheet 903H, 903B, 903S may be placed on different portions of the base cover 901 and has the non-adhesive portion 903HNA, 903SNA, respectively. In FIG. 9, the first part 903H and the second part 903B are separated from each other, and the second part 903B and the third part 903S are connected to each other, but the present invention is not limited thereto. In other embodiments, the first part 903H and the second part 903B may be connected to each other, and the second part 903B and the third part 903S are separated from each other.

Likewise, referring to FIG. 10, the cover sheet 1003 may have multiple sets of a plurality of cover sheets: a first set 903H, a second set 903B, and third set 903S. Thus, the first part 1003H covering the hood shape, the second part 1003B covering the first rectangular part, and the third part 1003S covering the third rectangular part may be separated from each other. Accordingly, each of the first part 1003H, the second part 1003B, and the third part 1003S may have respective the non-adhesive portion 1003HNA, 1003BNA, 1003SNA.

Figure 11:
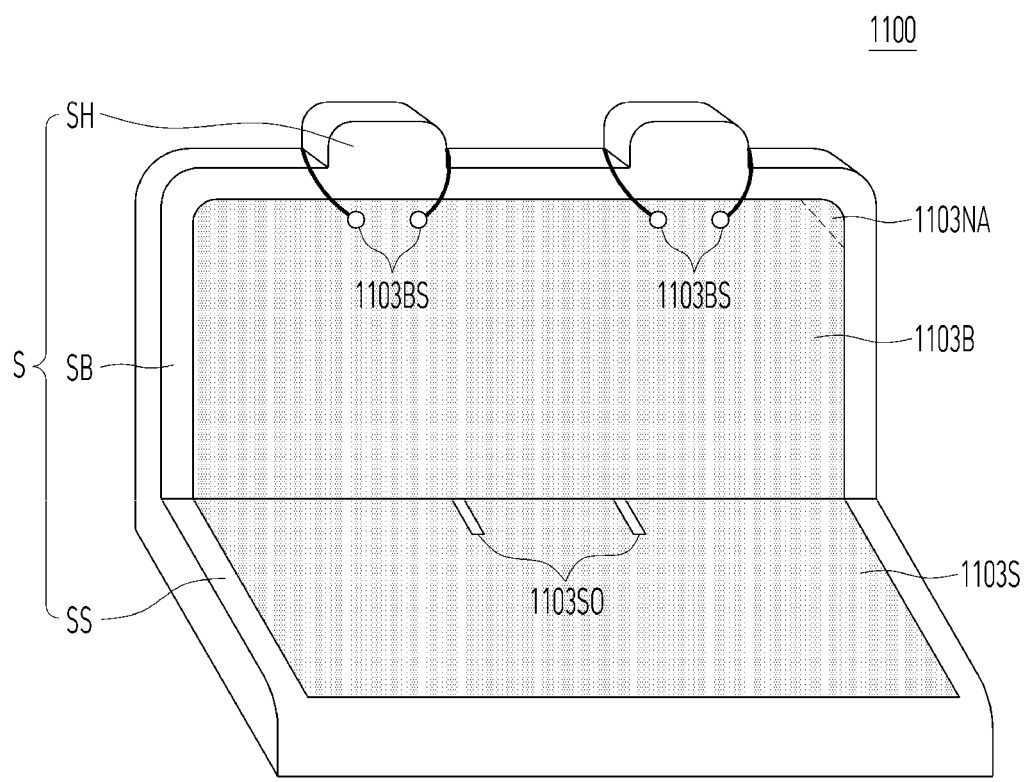
FIG. 11 is a perspective view illustrating a hygienic cover 1100 that covers a seat S of an automobile according to another embodiment of the present invention.

FIG. 11 is a perspective view illustrating a hygienic cover 1100 that covers a seat S of an automobile according to another embodiment of the present invention.

Figure 6C:
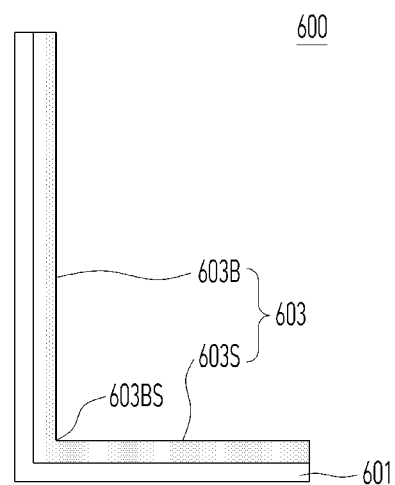
FIG. 6C is a side view of the hygienic cover 600 of FIG. 6A according to one embodiment of the present invention.

The hygienic covers 11 of FIG. 11 is similar to the hygienic covers 600 of FIGS. 6A to 6C, but there is a structural difference in that the hygienic cover 1100 covers a plurality of seats S which are connected to each other.

Referring to FIG. 11, the hygienic cover 1100 that covers multiple seats S comprises: a base cover 1101 and a plurality of cover sheets 1103 stacked on top of one another. The detailed structure of the plurality of the cover sheets 1103 is the same as that of the plurality of the cover sheets 103 in FIG. 1C.

The base cover 1101 includes a first rectangular shape of a plurality of backrests SB of the plurality of seats S and a second rectangular shape of a plurality of seating areas S of the plurality of seats S. The first and the second rectangular shape may be connected to each other.

Each cover sheet 1103 which is in a same level of the stacked cover sheets covers both the first rectangular shape and the second rectangular shape, and portions covering the first and the second rectangular shape may be connected to each other. In this case, a single non-adhesive portion 1103NA may be formed at an edge of each cover sheet. In other embodiments, the portions covering the first and the second rectangular shape may be separated from each other. In this case, the non-adhesive portion 1103NA may be formed at each separated piece of the cover sheet, respectively.

The hygienic cover 1100 may include strings to secure the cover 1100 to the seat S by hanging the strings on the headrest SH; connecting portions 1103BS to connect with the strings; and other openings 1103SO to expose seat belts and/or seat belt buckles.

Figure 12A:
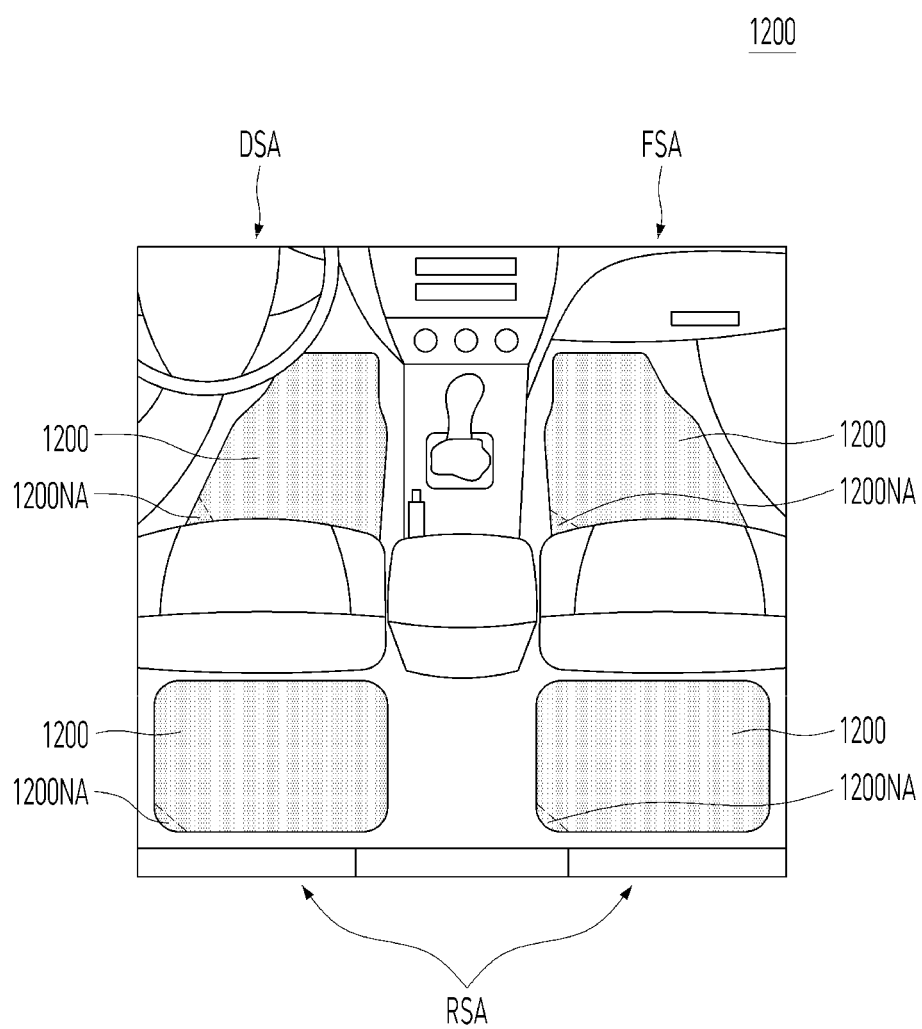
FIG. 12A is a perspective view illustrating a hygienic cover 1200 that covers a floor mat of an automobile according to one embodiment of the present invention.
Figure 12B:
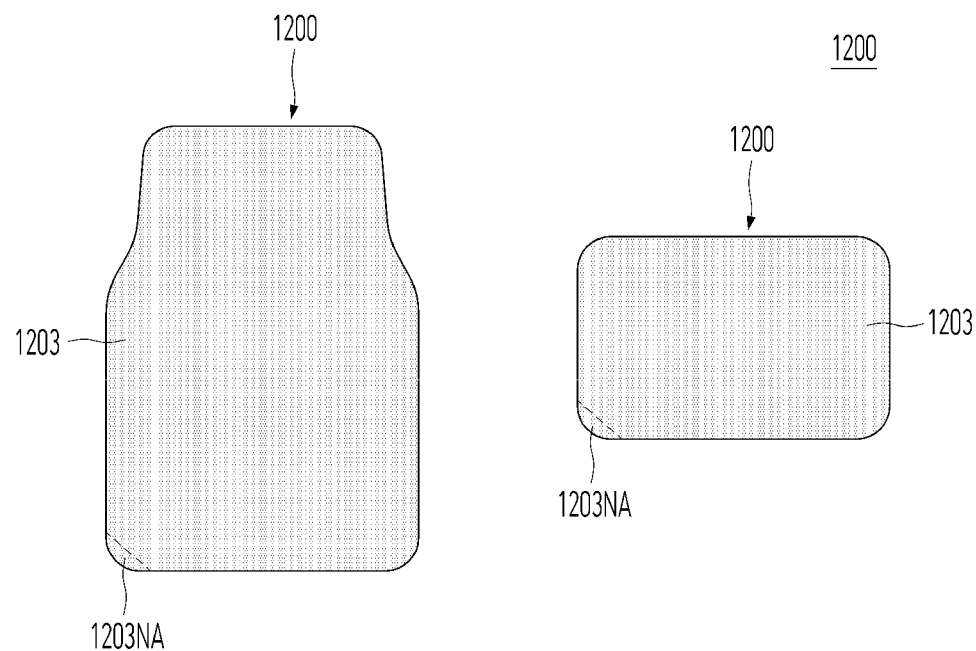
FIG. 12B is a top view of the hygienic cover 1200 of FIG. 12A when it is spread out in a flat plane according to one embodiment of the present invention.
Figure 12C:
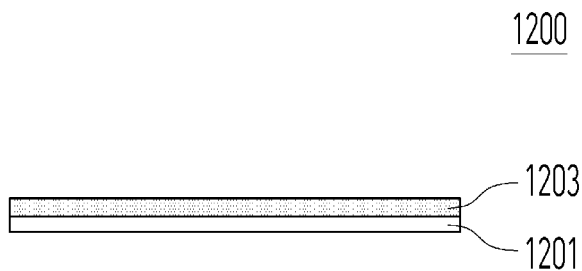
FIG. 12C is a side view of the hygienic cover 1200 of FIG. 12A according to one embodiment of the present invention.

FIG. 12A is a perspective view illustrating a hygienic cover 1200 that covers a floor mat of an automobile according to one embodiment of the present invention. FIG. 12B is a top view of the hygienic cover 1200 of FIG. 12A when it is spread out in a flat plane according to one embodiment of the present invention. FIG. 12C is a side view of the hygienic cover 1200 of FIG. 12A according to one embodiment of the present invention.

Referring to FIGS. 12A to 12C, the hygienic cover 1200 that covers the floor mat with which the shoes are in contact, comprises: a base cover 1201 and a plurality of cover sheets 1203 stacked on top of one another. The detailed structure of the plurality of the cover sheets 1203 is the same as that of the plurality of the cover sheets 103 in FIG. 1C. The hygienic cover 1200 has a shape covering the floor mat and may have a large rectangular shape covering the front floor mat of a driver seat area DSA and a front passenger seat area FSA and a small rectangular shape covering the rear floor mat of a rear passenger seat area RSA.

The base cover 1201 may be made of anti-bacterial nano silicone but is not limited thereto.

As described above referring to FIGS. 1A to 1I, the plurality of the cover sheets 1203 are stacked on top of one another. Each of the cover sheets 1203 includes a hygienic layer and an adhesive layer fixed to the bottom surface of the hygienic layer. The hygienic layer of the cover sheet 1203 may be made of at least one of fabric or paper but is not limited thereto.

Each of the cover sheets 1203 includes a non-adhesive portion 1203NA. The non-adhesive portion 1203NA is formed on an edge of each of the cover sheet 1203 and includes only the hygienic layer and does not include the adhesive layer as described in FIGS. 1G to 1I.

Figure 13A:
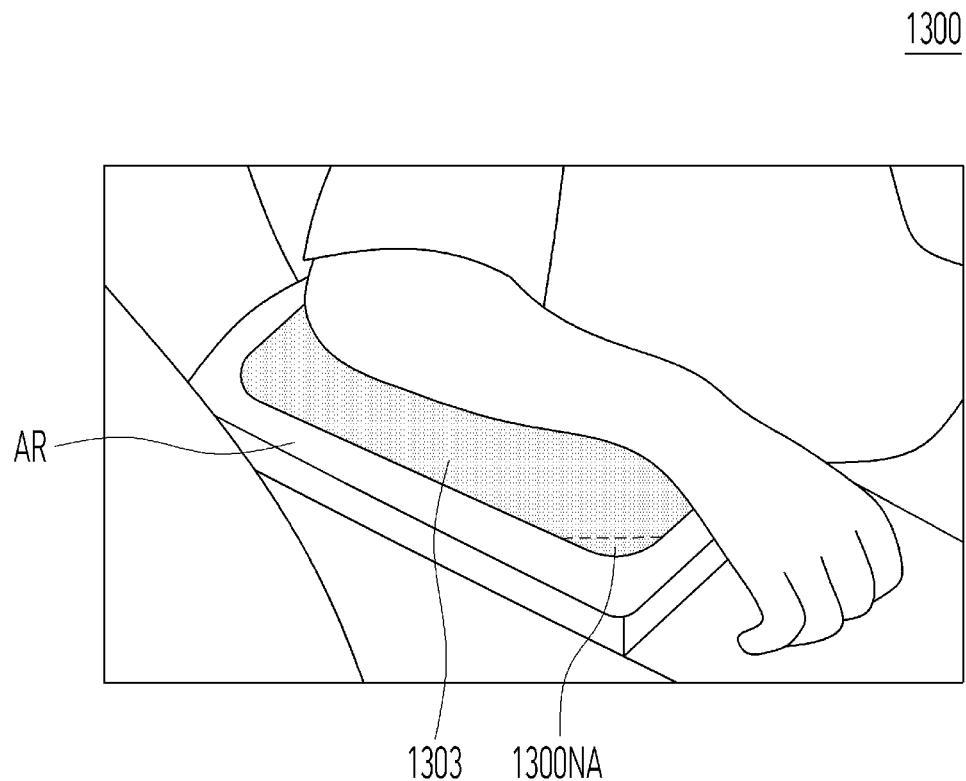
FIG. 13A is a perspective view illustrating a hygienic cover 1300 that covers an armrest AR mat of an automobile according to one embodiment of the present invention.
Figure 13B:
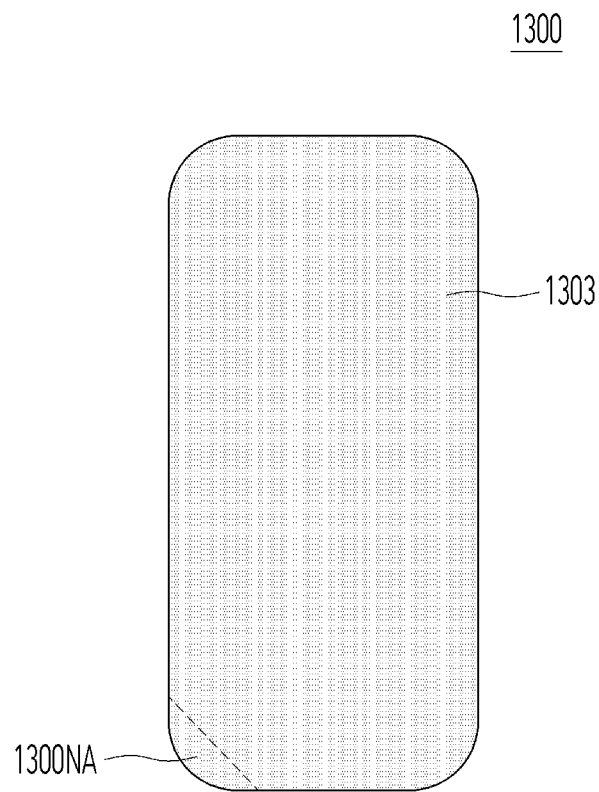
FIG. 13B is a top view of the hygienic cover 1300 of FIG. 13A when it is spread out in a flat plane according to one embodiment of the present invention.
Figure 13C:
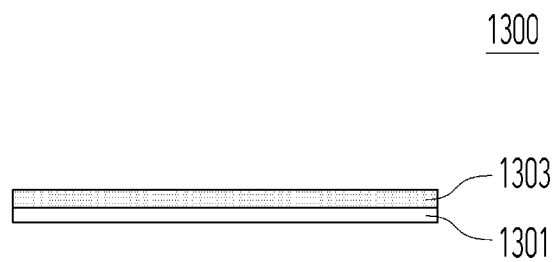
FIG. 13C is a side view of the hygienic cover 1300 of FIG. 13A according to one embodiment of the present invention.

FIG. 13A is a perspective view illustrating a hygienic cover 1300 that covers an armrest AR mat of an automobile according to one embodiment of the present invention. FIG. 13B is a top view of the hygienic cover 1300 of FIG. 13A when it is spread out in a flat plane according to one embodiment of the present invention. FIG. 13C is a side view of the hygienic cover 1300 of FIG. 13A according to one embodiment of the present invention.

Referring to FIGS. 13A to 13C, the hygienic cover 1300 that covers the armrest mat with which the arm of a driver is in contact, comprises: a base cover 1301 and a plurality of cover sheets 1303 stacked on top of one another. The detailed structure of the plurality of the cover sheets 1303 is the same as that of the plurality of the cover sheets 103 in FIG. 1C. The hygienic cover 13200 has a shape covering the armrest mat.

The base cover 1301 may be made of anti-bacterial nano silicone but is not limited thereto.

As described above referring to FIGS. 1A to 1I, the plurality of the cover sheets 1303 are stacked on top of one another. Each of the cover sheets 1303 includes a hygienic layer and an adhesive layer fixed to the bottom surface of the hygienic layer. The hygienic layer of the cover sheet 1303 may be made of at least one of fabric or paper but is not limited thereto.

Each of the cover sheets 1303 includes a non-adhesive portion 1303NA. The non-adhesive portion 1303NA is formed on an edge of each of the cover sheet 1303 and includes only the hygienic layer and does not include the adhesive layer as described in FIGS. 1G to 1I.

As described above, according to the present invention of the hygienic covers 100 to 1300, each of the cover sheets placed on top can be removed from the remaining of the cover sheets by pulling the non-adhesive portion off when the cover sheet becomes contaminated. Accordingly, by pulling the single cover sheet off after use and using another new cover sheet every time, the automobile can be maintained clean and hygienic with convenience, and the risk of transferring germs or pathogens through contact can be minimized.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A hygienic cover that covers a contact part with which a human body is in contact, the hygienic cover comprising:
    a base cover the bottom surface of which is directly in contact with an exterior surface of the contact part; and
    a plurality of cover sheets stacked on top of one another, wherein the bottom one of the stacked cover sheets is attached onto the top surface of the base cover, each of the cover sheets including:
        a hygienic layer, and
        an adhesive layer the top surface of which is fixed to the bottom surface of the hygienic layer, wherein the bottom surface of the adhesive layer is detachable from the top surface of the hygienic layer of another cover sheet of the plurality of cover sheets,
    wherein each of the cover sheets includes a non-adhesive portion, and the non-adhesive portion is formed on an edge of each of the cover sheet and includes only the hygienic layer and does not include the adhesive layer,
    wherein each of the cover sheets placed on top is removed from the remaining of the cover sheets by pulling the non-adhesive portion off when the cover sheet become contaminated,
wherein the base cover is made of anti-bacterial nano silicone,
wherein the hygienic layer of the cover sheet is made of at least one of fabric or paper,
wherein the top surface of the hygienic cover is more smooth than the bottom surface of the hygienic cover, and
wherein the cover sheet has at least one cut-out portion along an edge of the cover sheet so that the cover sheet wraps a three dimensional structure of the base cover.

2. The hygienic cover of claim 1, wherein the contact part is a gear shift knob of the automobile, and the base cover has a pocket shape fitting over the gear shift knob and having an opening in the bottom thereof to receive a gear shift stick to which the gear shift knob is connected.

3. The hygienic cover of claim 2, wherein each cover sheet which is in a same level of the stacked cover sheets includes multiple pieces, and each piece of the cover sheet is placed on different portions of the base cover and has the non-adhesive portion, respectively.

4. The hygienic cover of claim 1, wherein the contact part is a parking brake handle of the automobile, and the base cover has a cylinder shape fitting over the parking brake handle and having openings in the top and bottom thereof to receive the parking brake handle and expose the top of the parking brake handle.

5. The hygienic cover of claim 4, wherein each cover sheet which is in a same level of the stacked cover sheets includes multiple pieces, and each piece of the cover sheets is placed on different portions of the base cover and has the non-adhesive portion, respectively.

6. The hygienic cover of claim 1, wherein the contact part is at least one seat of the automobile, and the base cover has a first rectangular shape resting on a backrest of the seat, and a second rectangular shape connected from the bottom of the first rectangular shape and resting on a seating area of the seat,
    wherein each cover sheets which is in a same level of the stacked cover sheets covers the first and the second rectangular shape of the base cover.

7. The hygienic cover of claim 6, wherein the at least one seat corresponding to the contact part is a plurality of seats connected to each other,
    wherein the first rectangular shape of the base cover covers the plurality of backrests of the plurality of seats, and the second rectangular shape of the base cover covers the plurality of seating areas of the plurality of seats,
    wherein each cover sheet which is in a same level of the stacked cover sheets covers both the first rectangular shape and the second rectangular shape.

8. The hygienic cover of claim 6, wherein each cover sheet which is in a same level of the stacked cover sheets includes a first part covering the first rectangular part and a second part covering the second rectangular part,
    wherein the first and the second part of the each cover sheet are separate from each other,
    wherein each of the first and the second part has the non-adhesive portion, respectively.

9. The hygienic cover of above, 6, wherein the base cover includes a hood shape on the top thereof to receive a headrest of the seat, the first rectangular shape connected from the bottom of the hood shape, and the second rectangular shape,
    wherein each cover sheet which is in a same level of the stacked cover sheets includes a first part covering the hood shape, a second part covering the first rectangular part, and a third part covering the second rectangular part.

10. The hygienic cover of claim 9, wherein the first part of the cover sheet does not cover the back of the hood shape of the base cover with which the human body is not contact.

11. The hygienic cover of claim 10, wherein either the first part and the second part are separated from each other, the second part and the third part are separated from each other, or both are separated from each other,
    wherein each piece of separated parts of the cover sheet has the non-adhesive portion, respectively.

12. The hygienic cover of claim 1, wherein the contact part is a floor mat of the automobile, and the base cover has a flat rectangular shape covering a floor area of an interior space of the automobile.

13. The hygienic cover of claim 1, wherein the contact part is an armrest mat of the automobile, and the base cover has a flat rectangular shape covering the armrest mat.

14. A hygienic cover that covers a contact part with which a human body is in contact, the hygienic cover comprising:
    a base cover the bottom surface of which is directly in contact with an exterior surface of the contact part; and
    a plurality of cover sheets stacked on top of one another, wherein the bottom one of the stacked cover sheets is attached onto the top surface of the base cover, each of the cover sheets including:

a hygienic layer, and an adhesive layer the top surface of which is fixed to the bottom surface of the hygienic layer, wherein the bottom surface of the adhesive layer is detachable from the top surface of the hygienic layer of another cover sheet of the plurality of cover sheets, wherein each of the cover sheets includes a non-adhesive portion, and the non-adhesive portion is formed on an edge of each of the cover sheet and includes only the hygienic layer and does not include the adhesive layer, wherein each of the cover sheets placed on top is removed from the remaining of the cover sheets by pulling the non-adhesive portion off when the cover sheet become contaminated, wherein the contact part is a steering wheel, and the base cover has a circular channel shape fitting over the steering wheel and having an opening along an inner circumference of the circular channel shape to receive the steering wheel, wherein each of the cover sheets has a rectangular shape with a plurality of triangular cut-out portions formed along the edge of the cover sheet when the cover sheet is spread out in a flat plane and is placed on the base cover in a way that two edges of the triangular cut-out portion meets each other so that the rectangular shape wraps the exterior surface of the base cover.

15. The hygienic cover of claim 14, wherein each cover sheet which is in a same level of the stacked cover sheets includes two pieces, and the two pieces are placed on different portions of the base cover corresponding to the left and right sides of the steering wheel, respectively, wherein each of the pieces has the non-adhesive portion, respectively.

16. A hygienic cover that covers a contact part with which a human body is in contact, the hygienic cover comprising:

a silicone base cover the bottom surface of which is directly in contact with an exterior surface of the contact part; and a plurality of cover sheets placed on the silicone base cover and each cover sheet stacked on top of one another, each of the cover sheet including:

a hygienic layer made of at least one of fabric or paper; and an adhesive layer attached to the bottom surface of the hygienic layer, wherein the top surface of the hygienic layer is more smooth than the bottom surface of the hygienic cover, wherein the adhesive layer is fixed to the bottom surface of the hygienic layer and is detachable from the top surface of the hygienic layer of another of the cover sheets, wherein each of the cover sheet has at least one cut-out portion along an edge of the cover sheet so that the cover sheet wraps a three dimensional structure of the base cover, wherein each of the cover sheet includes a non-adhesive portion, and the non-adhesive portion is formed on an edge of each of the cover sheet and does not include the adhesive layer, wherein each of the cover sheets placed on top is removed from the remaining of the cover sheets by pulling the non-adhesive portion off when the cover sheet becomes contaminated.

17. The hygienic cover of claim 16, wherein each cover sheet which is in a same level of the stacked cover sheets includes multiple pieces, and each piece of the cover sheet is placed on different portions of the silicone base cover and has the non-adhesive portion, respectively.

* * * * *